(12) United States Patent
Sykora et al.

(10) Patent No.: US 9,417,376 B2
(45) Date of Patent: Aug. 16, 2016

(54) DUAL-SIDED FILM WITH COMPOUND PRISMS

(71) Applicant: 3M INNOVATIVE PROPERTIES COMPANY, St. Paul, MN (US)

(72) Inventors: Michael J. Sykora, New Richmond, WI (US); John A. Wheatley, Lake Elmo, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 0 days.

(21) Appl. No.: 15/043,838

(22) Filed: Feb. 15, 2016

(65) Prior Publication Data
US 2016/0161663 A1 Jun. 9, 2016

Related U.S. Application Data

(62) Division of application No. 13/850,276, filed on Mar. 25, 2013, now Pat. No. 9,261,641.

(51) Int. Cl.
| | |
|---|---|
| F21V 5/02 | (2006.01) |
| F21V 8/00 | (2006.01) |
| G02B 5/04 | (2006.01) |
| G02B 3/00 | (2006.01) |

(52) U.S. Cl.
CPC ............ *G02B 6/0053* (2013.01); *G02B 3/0056* (2013.01); *G02B 5/045* (2013.01); *G02B 6/0068* (2013.01)

(58) Field of Classification Search
CPC .... G02B 6/0053; G02B 6/0068; G02B 6/043; G02B 6/056
See application file for complete search history.

(56) References Cited

U.S. PATENT DOCUMENTS

| | | | |
|---|---|---|---|
| 3,213,753 | A | 10/1965 | Rogers |
| 5,035,486 | A | 7/1991 | Inokuchi |

(Continued)

FOREIGN PATENT DOCUMENTS

| | | |
|---|---|---|
| JP | 2000231103 A | 8/2000 |
| JP | 2005-266293 | 9/2005 |

(Continued)

OTHER PUBLICATIONS

International Search Report from International Application No. PCT/US2014/031665, mailed Jul. 4, 2014, 3 pages.

(Continued)

*Primary Examiner* — Thomas M Sember
(74) *Attorney, Agent, or Firm* — Lisa P. Fulton; Daniel J. Iden

(57) ABSTRACT

Dual-sided optical films have extended prisms formed in one major surface, and extended lenslets formed in an opposite major surface. Some or all of the prisms are compound prisms, in which the two inclined surfaces of each compound prism each include a tip portion, a base portion, and an intermediate portion disposed between the tip portion and the base portion, the intermediate and tip portions forming a concave shape and the intermediate and base portions forming a convex shape, or vice versa. When obliquely incident light, e.g. from a light guide, is incident on the prism side of the film, an output beam emerges from the lenslet side of the film. The output beam has an intensity distribution with a sharp left beam edge and a sharp right beam edge, these beam edges having 10%-to-90% transition angles of no more than 7, 6, 5, 4, 3, or 2 degrees.

13 Claims, 21 Drawing Sheets

(56) References Cited

U.S. PATENT DOCUMENTS

| | | |
|---|---|---|
| 5,661,599 A | 8/1997 | Borner |
| 5,825,436 A | 10/1998 | Knight |
| 5,852,512 A | 12/1998 | Chikzawa |
| 5,877,829 A | 3/1999 | Okamoto |
| 6,211,930 B1 | 4/2001 | Sautter |
| 6,310,722 B1 | 10/2001 | Baek |
| 6,724,536 B2 | 4/2004 | Magee et al. |
| 6,825,985 B2 | 11/2004 | Brown |
| 7,165,959 B2 | 1/2007 | Humlicek |
| 7,210,836 B2 | 5/2007 | Sasagawa |
| 7,750,982 B2 | 7/2010 | Nelson |
| 8,035,771 B2 | 10/2011 | Brott |
| 8,068,187 B2 | 11/2011 | Huizinga |
| 8,339,333 B2 | 12/2012 | Casner |
| 2005/0052750 A1 | 3/2005 | King |
| 2005/0270645 A1 | 12/2005 | Cossairt |
| 2005/0276071 A1 | 12/2005 | Sasagawa |
| 2007/0139765 A1 | 6/2007 | Daniel |
| 2007/0242479 A1 | 10/2007 | Ohta |
| 2007/0268590 A1 | 11/2007 | Schwerdtner |
| 2009/0091668 A1 | 4/2009 | Kristoffersen |
| 2009/0141895 A1 | 6/2009 | Anderson |
| 2009/0219432 A1 | 9/2009 | Palum |
| 2009/0237576 A1 | 9/2009 | Nelson |
| 2010/0066960 A1 | 3/2010 | Smith |
| 2010/0091226 A1 | 4/2010 | Takatani |
| 2010/0205667 A1 | 8/2010 | Anderson |
| 2010/0208349 A1 | 8/2010 | Beer |
| 2010/0328778 A1 | 12/2010 | Mimura |
| 2011/0149391 A1 | 6/2011 | Brott |
| 2012/0154450 A1 | 6/2012 | Aho |
| 2012/0236403 A1 | 9/2012 | Sykora |
| 2013/0039077 A1 | 2/2013 | Edmonds |

FOREIGN PATENT DOCUMENTS

| | | |
|---|---|---|
| JP | 2006107997 A | 4/2006 |
| JP | 2008070456 A | 3/2008 |
| JP | 2008-304700 | 12/2008 |
| WO | WO 2009-153701 | 12/2009 |
| WO | WO 2010-120422 | 10/2010 |
| WO | WO 2010-120468 | 10/2010 |
| WO | WO 2010-120864 | 10/2010 |
| WO | WO 2011-084303 | 7/2011 |
| WO | WO 2011-088161 | 7/2011 |
| WO | WO 2012-033583 | 3/2012 |
| WO | WO 2012-054320 | 4/2012 |
| WO | WO 2013-012858 | 1/2013 |
| WO | WO 2013-048847 | 4/2013 |
| WO | WO 2013-049088 | 4/2013 |

OTHER PUBLICATIONS

Johnson, U.S. Appl. No. 13/850,277, Dual-Sided Film with Split Light Spreading Structures, filed Mar. 25, 2013.

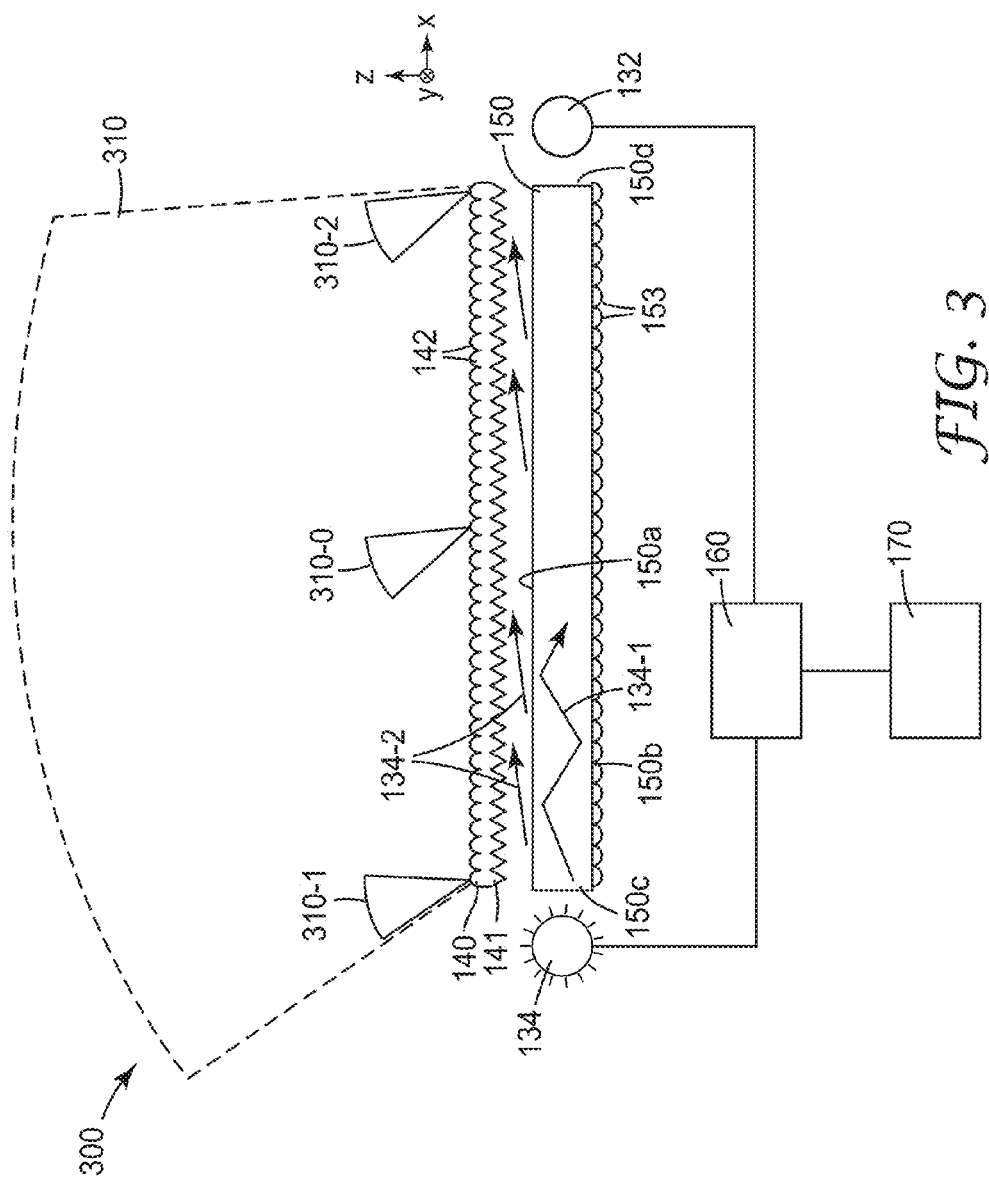

DUAL-SIDED FILM WITH COMPOUND PRISMS

FIELD OF THE INVENTION

This invention relates generally to microstructured optical films, particularly to such films in which the opposed major surfaces are both structured, as well as articles and systems that incorporate such films, and methods pertaining to such films.

BACKGROUND

Optical films that have structured surfaces on opposed major surfaces thereof, referred to herein as dual-sided optical films, are known. In some such films, one structured surface has lenticular features formed therein and the other structured surface has prismatic features formed therein. There is a one-to-one correspondence of prismatic features to lenticular features, and individual prismatic features are elongated and extend parallel to each other and to individual lenticular features, which are also elongated. Such films have been disclosed for use as optical light redirecting films in autostereoscopic 3D display systems. See for example U.S. Pat. No. 8,035,771 (Brott et al.) and U.S. Pat. No. 8,068,187 (Huizinga et al.), and patent application publications US 2005/0052750 (King et al.), US 2011/0149391 (Brott et al.), and US 2012/0236403 (Sykora et al.).

SUMMARY

We have developed a new family of dual-sided optical films in which extended prisms and extended lenslets are formed in opposite major surfaces of the film and in a one-to-one correspondence with each other, and these elements are configured to produce an output beam that is characterized in a plane of observation perpendicular to the prisms by sharp transitions or edges on both sides of the beam, and by a finite angular spread or width. The film is operable with a light guide having at least one major surface adapted to emit light preferentially at oblique angles, and the dual-sided film is disposed proximate the light guide and oriented so that the oblique light emitted from the major surface of the light guide enters the optical film through the prisms, and the dual-sided film converts the oblique light into the output beam with the sharp edges. Light sources may be disposed at opposite ends of the light guide to emit oblique light in two different directions, such that oblique light of one direction (originating from one light source) is converted by the dual-sided film into a first such sharp-edged output beam, and oblique light in the other direction (originating from the other light source) is converted by the dual-sided film into a second such sharp-edged output beam. The first and second sharp-edged output beams may overlap (including the limiting case where the nearest beam edges of the first and second output beams coincide), or may not overlap. The new dual-sided films can be used in systems to provide a low profile (thin) lighting device whose output beam has crisp, sharp beam edges, e.g. as would be provided by a conventional spotlight, but in a much thinner profile without the need for bulky lenses or baffles such as are used in spotlights, and with an emitting surface that is (typically) larger and more extended in-plane.

Some or all of the prisms on the dual-sided film are compound prisms, in which the two inclined surfaces of each compound prism each include a tip portion, a base portion, and an intermediate portion disposed between the tip portion and the base portion. Each compound prism also has a sharp vertex. The intermediate portion of each inclined surface of a given compound prism forms a first profile shape with the tip portion and a second profile shape with the base portion. Either the first profile shape is concave and the second profile shape is convex, or the first profile shape is convex and the second profile shape is concave. In some cases, the intermediate portion has a smaller angle of inclination than that of the tip portion and the base portion, such that the first profile shape is concave and the second profile shape is convex. In other cases, the intermediate portion has a larger angle of inclination than that of the tip portion and the base portion, such that the first profile shape is convex and the second profile shape is concave. When obliquely incident light is incident on the prism side of the film, an output beam emerges from the lenslet side of the film. In a plane of observation perpendicular to an elongation axis of the prisms, the output beam has an intensity distribution with a sharp left beam edge and a sharp right beam edge, these beam edges having 10%-to-90% transition angles of no more than 7, or 6, or 5, or 4, or 3, or 2 degrees.

The present application further discloses, inter alia, optical films having opposed first and second structured surfaces, the optical film including a plurality of extended prisms formed in the first structured surface, and a plurality of extended lenslets formed in the second structured surface, the prisms and lenslets being arranged in a one-to-one correspondence of lenslets to prisms. At least some of the prisms are compound prisms, each compound prism having two inclined surfaces that are compound, each such compound inclined surface of each compound prism having a tip portion, a base portion, and an intermediate portion disposed between the tip portion and the base portion. The compound prisms also each have a sharp vertex. The intermediate portion forms a first profile shape with the tip portion and a second profile shape with the base portion. Either the first profile shape is concave and the second profile shape is convex, or the first profile shape is convex and the second profile shape is concave.

For each compound inclined surface of each compound prism, at least one of the tip portion, the base portion, and the intermediate portion may be planar. Furthermore, the tip, base, and intermediate portions may all be planar. For each compound inclined surface of each compound prism, at least one of the tip portion, the base portion, and the intermediate portion may be curved. Furthermore, the tip portion, the base portion, and the intermediate portion may all be curved. The compound inclined surface of each compound prism may be continuously curved.

For each compound prism, the tip portions of its two inclined surfaces may intersect to form the sharp vertex, and the vertex may have a radius of curvature no more than 3 microns, or no more than 2 microns, or no more than 1 micron.

The prisms may extend along respective first elongation axes that are parallel to each other, and the lenslets may extend along respective second elongation axes that are parallel to each other. The first axes may be parallel to the second axes.

The prisms may have respective prism optical axes, and at least some of the compound prisms may be symmetrically shaped with respect to the prism optical axis. However, at least some of the compound prisms may not be symmetrically shaped with respect to their respective prism optical axes. For each prism-lenslet pair, the lenslet may have a focal point, and the prism may have a vertex that is disposed at or near the focal point.

The intermediate portion may have a smaller angle of inclination than that of the tip portion and the base portion, such that the first profile shape is concave and the second profile shape is convex. Alternatively, the intermediate portion may have a larger angle of inclination than that of the tip portion and the base portion, such that the first profile shape is convex, and the second profile shape is concave.

We also disclose optical systems that include such optical films in combination with a light guide having a major surface adapted to emit light preferentially at oblique angles, and the optical film may be disposed proximate the light guide and oriented so that light emitted from the major surface of the light guide enters the optical film through the first structured surface. In some cases, the optical film and the light guide may be non-planar. In some cases, the optical film and the light guide may be flexible. In some cases, the system may also include one or more light sources attached to the light guide. In some cases, the system may be or include a display, a backlight, a luminaire, a task light, or a general-purpose lighting module.

We also disclose optical systems that include a light guide, a first light source, and an optical film. The light guide has a major surface adapted to emit light. The first light source is configured to inject light into the light guide along a first direction. The optical film has opposed first and second structured surfaces, the first structured surface having a plurality of extended prisms formed therein, and the second structured surface having a plurality of extended lenslets formed therein, and the prisms and lenslets are arranged in a one-to-one correspondence of lenslets to prisms. The optical film is disposed proximate the light guide and oriented so that light emitted from the major surface of the light guide enters the optical film through the first structured surface and exits the second structured surface of the optical film, the light exiting the optical film forming a first output beam when the first light source is energized. The first output beam has a first intensity distribution as a function of angle θ, the first intensity distribution being characterized by a first left beam edge at an angle $\theta_{LE1}$, a first right beam edge at an angle $\theta_{RE1}$, a first baseline intensity Ibaseline1, and a first maximum intensity Imax1 and a first minimum intensity Imin1 between the first left and first right beam edges. The first left beam edge has a sharpness characterized by a transition angle $\Delta\theta_{LE1}$, and the first right beam edge has a sharpness characterized by a transition angle $\Delta\theta_{RE1}$, where $\Delta\theta_{LE1}$ and $\Delta\theta_{RE1}$ are measured from 10% to 90% intensity levels between Imax1 and Ibaseline1. The transition angle $\Delta\theta_{LE1}$ is no more than 7 degrees (or no more than or 6, or 5, or 4, or 3, or 2 degrees), the transition angle $\Delta\theta_{RE1}$ is no more than 7 degrees (or no more than 6, or 5, or 4, or 3, or 2 degrees), Imin1 is at least Ibaseline1+20%* (Imax1−Ibaseline1), and a first beam width equal to $\theta_{RE1}-\theta_{LE1}$ is at least 10 degrees.

At least some of the prisms in the optical film may be compound prisms whose two inclined surfaces are compound and whose vertex is sharp. Each compound inclined surface of each such compound prism has a tip portion, a base portion, and an intermediate portion disposed between the tip portion and the base portion. The intermediate portion forms a first profile shape with the tip portion and a second profile shape with the base portion, and either the first profile shape is concave and the second profile shape is convex, or the first profile shape is convex and the second profile shape is concave. The system may also include a second light source configured to inject light into the light guide along a second direction different from the first direction, and the light exiting the optical film forms a second output beam when the second light source is energized. The second output beam has a second intensity distribution as a function of angle θ, the second intensity distribution being characterized by a second left beam edge at an angle $\theta_{LE2}$, a second right beam edge at an angle $\theta_{RE2}$, a second baseline intensity Ibaseline2, and a second maximum intensity Imax2 and a second minimum intensity Imin2 between the second left and second right beam edges. The second left beam edge has a sharpness characterized by a transition angle $\Delta\theta_{LE2}$, and the second right beam edge has a sharpness characterized by a transition angle $\Delta\theta_{RE2}$, where $\Delta\theta_{LE2}$ and $\Delta\theta_{RE2}$ are measured from 10% to 90% intensity levels between Imax2 and Ibaseline2. The transition angle $\Delta\theta_{LE2}$ is no more than 7 degrees (or no more than 6, or 5, or 4, or 3, or 2 degrees), the transition angle $\Delta\theta_{RE2}$ is no more than 7 degrees (or no more than 6, or 5, or 4, or 3, or 2 degrees), Imin2 is at least Ibaseline2 +20%*(Imax2−Ibaseline2), and a second beam width equal to $\theta_{RE2}-\theta_{LE2}$ is at least 10 degrees.

The transition angles $\Delta\theta_{LE1}$, $\Delta\theta_{RE1}$, $\Delta\theta_{LE2}$, and $\Delta\theta_{RE2}$ may each be no more than 7 degrees, or no more than 6 degrees, or no more than 5 degrees, or no more than 4 degrees, or no more than 3 degrees, or no more than 2 degrees, and they may each be at least 1 degree or 2 degrees. The first minimum intensity Imin1 may be at least Ibaseline1+30%*(Imax1−Ibaseline1), or at least Ibaseline1+40%(Imax1−Ibaseline1), and the second minimum intensity Imin2 may be at least Ibaseline2+ 30%*(Imax2−Ibaseline2), or at least Ibaseline2+40%* (Imax2−Ibaseline2). The first beam width and the second beam width may each be at least 20 degrees, or at least 30 degrees, or in a range from 10 to 40 degrees. The angle $\theta_{LE2}$ may be in a range from $\theta_{LE1}$ to $\theta_{RE1}$, such that the first and second output beams overlap. The first and second output beams may be spaced apart from each other, and may have nearest beam edges separated by at least 3 degrees.

The optical film and the light guide may be non-planar. The optical film and the light guide may be flexible. The first light source may be attached to the light guide. The optical film may be attached to the light guide. The system may be or include a display, a backlight, a luminaire, a task light, or a general-purpose lighting module.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 2A is a view of the light guide of FIG. 2 in combination with collimated light sources, illustrating how a light guide can be effectively subdivided or partitioned as a function of which light sources on a given side of the light guide are turned ON;

FIG. 3 is a schematic side view of a lighting system such as that of FIG. 1B, with one light source energized, this light source producing a first output beam, with two sharp transitions or edges, emerging from the dual-sided optical film;

In the figures, like reference numerals designate like elements.

DETAILED DESCRIPTION OF ILLUSTRATIVE EMBODIMENTS

Figure 1A:
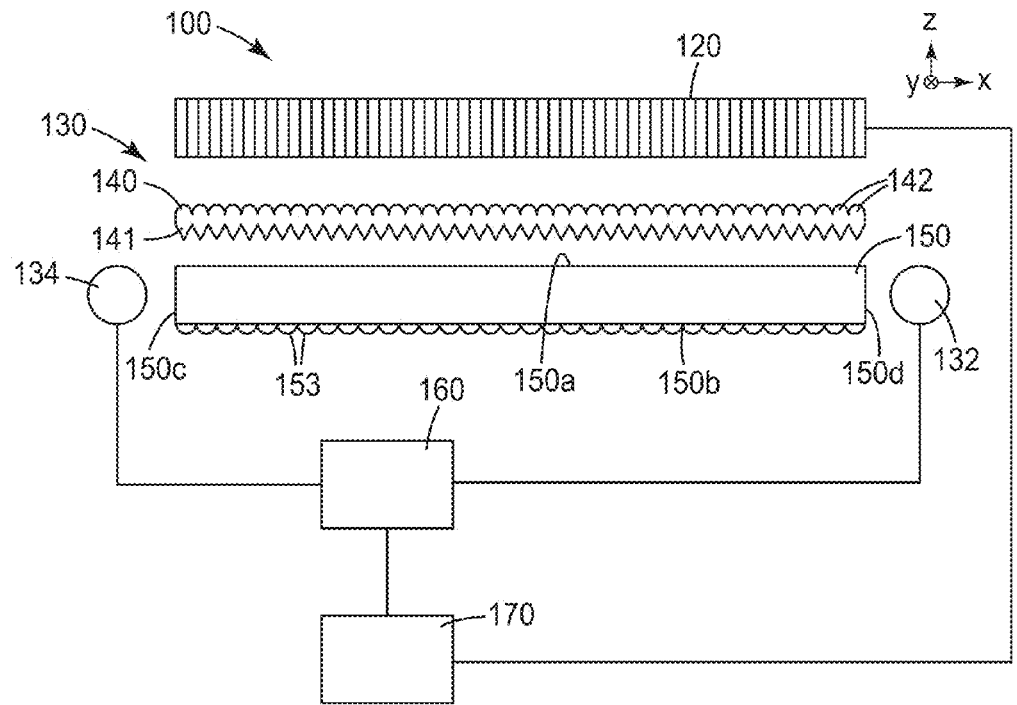
FIG. 1A is a schematic side view of an illustrative display system that includes a dual-sided optical film.

An optical system 100 capable of utilizing the unique properties of the disclosed dual-sided optical films is shown in FIG. 1A. In this case, the optical system 100 is a display system, but other devices and applications, including ambient lighting devices such as luminaires or task lights, are also contemplated. The system 100 is shown in relation to a Cartesian x-y-z coordinate system so that directions and orientations of selected features can be more easily discussed. The system 100 includes a display panel 120, e.g., a liquid crystal display (LCD) panel, and a backlight 130 positioned to provide light to the display panel 120. The backlight 130 includes one or more light guides 150, one or more first light sources 134, and one or more second light sources 132. The backlight 130 also includes a dual-sided optical film 140, details of which are discussed further below. The x-y plane of the coordinate system is assumed to lie parallel to the plane of the film 140, which is also typically parallel to the plane of the light guide 150 and display panel 120.

The light sources 132, 134 are disposed on opposite ends of the light guide, and inject light into the light guide from opposite directions. Each of the light sources may emit light that is nominally white and of a desired hue or color temperature. Alternatively, each light source may emit colored light, e.g., light perceived to be red, green, blue, or another known non-white color, and/or may emit ultraviolet and/or infrared (including near infrared) light. The light sources may also be or comprise clusters of individual light emitting devices, some or all of which may emit non-white colored light, but the combination of light from the individual devices may produce nominally white light, e.g. from the summation of red, green, and blue light. Light sources on opposite ends of the light guide may emit light of different white or non-white colors, or they emit light of the same colors. The light sources 132, 134 can be of any known design or type, e.g., one or both may be or comprise cold cathode fluorescent lamps (CCFLs), and one or both may be or comprise one or more inorganic solid state light sources such as light emitting diodes (LEDs) or laser diodes, and one or both may be or comprise one or more organic solid state light sources such as organic light emitting diodes (OLEDs). The round shapes used to represent the light sources in the drawings are merely schematic, and should not be construed to exclude LED(s), or any other suitable type of light source. The light sources 132, 134 are preferably electronically controllable such that either one can be energized to an ON state (producing maximum or otherwise significant light output) while keeping the other one in an OFF state (producing little or no light output), or both can be in the ON state at the same time if desired, and both may be turned OFF during non-use. In many cases, the light sources 132, 134 do not need to satisfy any particular requirement with regard to switching speed. For example, although either or both light sources 132, 134 may be capable of repetitively transitioning between the OFF state and the ON state at a rate that is imperceptible to the human eye (e.g., at least 30 or 60 Hz), such a capability is not necessary in many embodiments. (For flicker-free operation, transition rates may be in a range from 50 to 70 Hz, or more; for two-sided operation, transition rates may be in a range from 100 to 140 Hz (or more) for the display panel (if any) and the light sources.) Thus, light sources that have much slower characteristic transition times between the ON and OFF states can also be used.

The light guide 150 includes a first light input side 150c adjacent to the first light source 134 and an opposing second light input side 150d adjacent to the second light source 132. A first light guide major surface 150b extends between the first side 150c and second side 150d. A second light guide major surface 150a, opposite the first major surface 150b, extends between the first side 150c and the second side 150d. The major surfaces 150b, 150a of the light guide 150 may be substantially parallel to each other, or they may be non-parallel such that the light guide 150 is wedge-shaped. Light may be reflected or emitted from either surface 150b, 150a of the light guide 150, but in general light is emitted from surface 150a and is reflected from surface 150b. In some cases, a highly reflective surface may be provided on or adjacent to the first surface 150b to assist in re-directing light out through the second surface 150a. Light extraction features 153, e.g., shallow prisms, lenticular features, white dots, haze coatings, and/or other features, may be disposed on one or both major surfaces 150b, 150a of the light guide 150. Exemplary light extraction features for the light guide are discussed below in connection with FIG. 2. The light extraction features 153 are typically selected so that light emitted from the major surface 150a propagates preferentially at highly oblique angles in air as measured in the x-z plane, rather than propagating at normal or near-normal propagation directions that are parallel to, or deviate only slightly from, the z-axis (again as measured in the x-z plane). For example, the light emitted from the surface 150a into air may have a peak intensity direction that makes an angle relative to the surface normal (z-axis) of 60 degrees or more, or 70 degrees or more, or 80 degrees or more, where the peak intensity direction refers to the direction along which the intensity distribution of the output beam in the x-z plane is a maximum.

The light guide 150 may have a solid form, i.e., it may have an entirely solid interior between the first and second major surfaces 150a, 150b. The solid material may be or comprise any suitable light-transmissive material, such as glass, acrylic, polyester, or other suitable polymer or non-polymer materials. Alternatively, the light guide 150 may be hollow, i.e., its interior may be air or another gas, or vacuum. If hollow, the light guide 150 is provided with optical films or similar components on opposite sides thereof to provide the first and second major surfaces 150a, 150b. Hollow light guides may also be partitioned or subdivided into multiple light guides. Whether solid or hollow, the light guide 150 may be substantially planar, or it may be non-planar, e.g., undulating or curved, and the curvature may be slight (close to planar) or great, including cases where the light guide curves in on itself to form a complete or partial tube. Such tubes may have any desired cross-sectional shape, including curved shapes such as a circle or ellipse, or polygonal shapes such as a square, rectangle, or triangle, or combinations of any such shapes. A hollow tubular light guide may in this regard be made from a single piece of optical film or similar component(s) that turns in on itself to form a hollow tube, in which case the first and second major surfaces of the light guide may both be construed to be provided by such optical film or component(s). The curvature may be only in the x-z plane, or only in the y-z plane, or in both planes. Although the light guide and dual-sided film may be non-planar, for simplicity they are shown in the figures as being planar; in the former case one may interpret the figures as showing a small enough portion of the light guide and/or optical film such that it appears to be planar. Whether solid or hollow, depending on the material(s) of construction and their respective thicknesses, the light guide may be physically rigid, or it may be flexible. A flexible light guide or optical film may be flexed or otherwise manipulated to change its shape from planar to curved or vice versa, or from curved in one plane to curved in an orthogonal plane.

The dual-sided optical film 140 is disposed between the display panel 120 and the light guide 150. The film 140 has opposed structured surfaces. On the structured surface that is oriented away from the light guide 150, lenslets 142 are formed.

Prisms 141 are formed on the opposite structured surface of the film 140, which is oriented towards the light guide 150. In this orientation, light emitted from the major surface 150a of the light guide 150 is incident on the prisms 141, which help to deviate the incident light. The incident light is deviated by and passes through the film 140 to provide an output light beam that emerges from the film 140. As described further below, the properties of the output beam are strongly influenced by which of the light sources 132, 134 is in an ON state. When one light source is ON, the output beam may subtend a first angular range. When the opposite light source is ON, the output beam may subtend a second angular range, which may or may not overlap with the first angular range. The prisms 141 are shown schematically in FIGS. 1A and 1B as having a simple V-shaped profile; however, some, most, or all of the prisms 141 may be compound prisms, the finer details of which are shown and described further below. The more complex prism shape can be used to provide output beams that have sharp beam edges on both sides thereof.

Figure 1B:
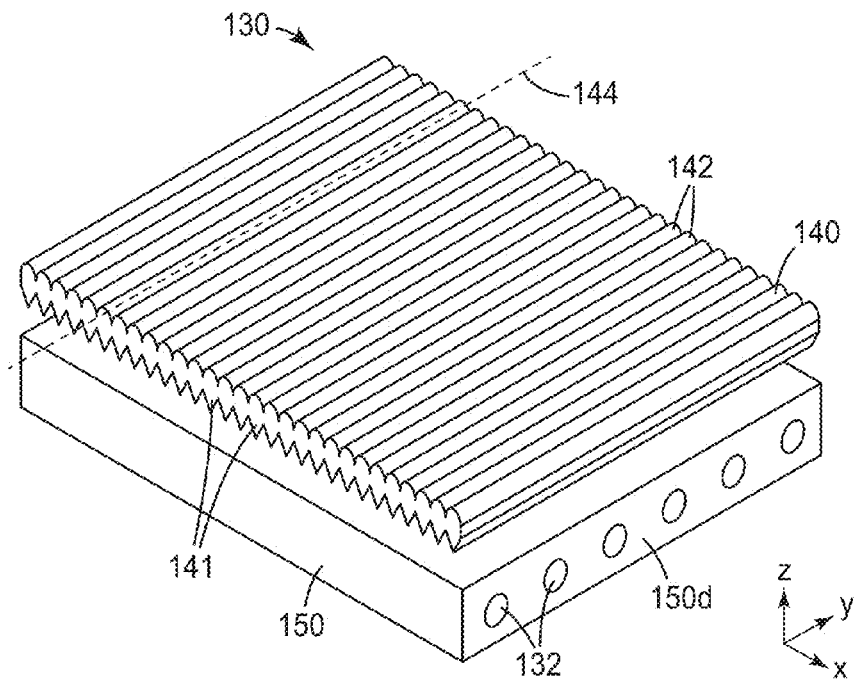
FIG. 1B is a schematic perspective view of a lighting system that may serve as the backlight in the display system of FIG. 1A, or that may be used in other applications.

Both the prisms 141 and the lenslets 142 are typically linear, or, in cases where one or both are not precisely linear (e.g. not straight), they are otherwise extended or elongated along a particular in-plane axis. Thus, the lenslets 142 may extend along lenslet axes that are parallel to each other. One such axis is shown in FIG. 1B as axis 144, which is assumed to be parallel to the y-axis. The prisms 141 may extend along respective prism axes that are parallel to each other. The lenslet axes of elongation are typically parallel to the prism axes of elongation. Perfect parallelism is not required, and axes that deviate slightly from perfect parallelism may also be considered to be parallel; however, misalignment results in different amounts of registration between a given prism/lenslet pair at different places along their length on the working surface of the dual-sided film—and such differences in the degree of registration (regardless of whether the degree of registration is tailored to have precise alignment, or intentional misalignment, of the relevant vertices or other reference points, as discussed below) are desirably about 1 micron or less. In some cases, extraction features 153 on the major surface 150b of the light guide may be linear or elongated along axes that are parallel to the elongation axes of the lenslets and prisms of the film 140; alternatively, such elongated extraction features 153 may be oriented at other angles.

In the film 140 or pertinent portion thereof, there is a one-to-one correspondence of prisms 141 to lenslets 142. Thus, for each prism 141 there is a unique lenslet 142 with which the given prism primarily interacts, and vice versa. One some, or all of the lenslets 142 may be in substantial registration with their respective prisms 141. Alternatively, the film 140 may be designed to incorporate a deliberate misalignment or misregistration of some or all of the lenslets relative to their respective prisms. Related to alignment or misalignment of the prisms and lenslets is the center-to-center spacings or pitches of these elements. In the case of a display system, the pitch of the lenslets 142 and the pitch of the prisms 141 may be selected to reduce or eliminate Moire patterns with respect to periodic features in the display panel 120. The pitch of the lenslets 142 and the pitch of the prisms 141 can also be determined based upon manufacturability. As LCD panels are manufactured with different pixel pitches, it can be desirable to change the pitch of the optical film to accommodate the different pixel pitches of the LCD panel. Useful pitch ranges for the respective elements on the structured surface of the optical film 140 is about 10 microns to about 140 microns, for example, but this should not be interpreted in an unduly limiting way.

The system 100 can have any useful shape or configuration. In many embodiments, the display panel 120, the light guide 150, and/or the dual-sided optical film 140 can have a square or rectangular shape. In some embodiments, however, any or all of these elements may have more than four sides and/or a curved shape.

A switchable driving element 160 is electrically connected to the first and second light sources 132, 134. This element may contain a suitable electrical power supply, e.g. one or more voltage sources and/or current sources, capable of energizing one or both of the light sources 132, 134. The power supply may be a single power supply module or element, or a group or network of power supply elements, e.g., one power supply element for each light source. The driving element 160 may also contain a switch that is coupled to the power supply and to the electrical supply lines that connect to the light sources. The switch may be a single transistor or other switching element, or a group or network of switching modules or elements. The switch and power supply within the driving element 160 may be configured to have several operational modes. These modes may include two, three, or all of: a mode in which only the first light source 134 is ON; a mode in which only the second light source 132 is ON; a mode in which both the first and second light sources are ON; and a mode in which neither of the first and second light sources are ON (i.e., both are OFF).

A controller 170 couples to the switchable driving element 160 and to the display panel 120. The controller 170 may control or direct the driving element into one of its operational modes so as to selectively energize the light sources. Coupling between the controller 170 and the driving element 160 may be wired, or wireless, or some combination of wired and wireless. For example, a user may employ a mobile phone or other mobile wireless device to activate the driving element 160, and the mobile phone or other wireless device may be considered to be part of the controller 170. The controller 170 may also control the display panel 120 so that it displays a desired image or series of images. Image information may be provided from the controller 170 to the display panel 120 in any known manner. The image may be a still image, sequence of images, video stream, and/or rendered computer graphics, for example.

We describe in more detail below how the dual-sided optical film 140, when provided with compound prisms, can provide the backlight (or other optical system) with the capability to produce at least two different output beams, each such beam having an angular distribution with sharp edges on both sides of the beam. The number of output beams provided by the backlight or system depends on which light sources are energized by the driving element 160, and the characteristics or features of the output beams are controlled by design details of the lenslets and compound prisms.

FIG. 1B is a schematic perspective view of the back light 130 showing the light guide 150, the optical film 140, and the second light sources 132. Like elements between FIGS. 1A and 1B have like reference numerals, and need not be further discussed. The optical film 140 includes lenslets 142 oriented away from the light guide 150 and prisms 141 with prism peaks oriented toward the light guide 150. The axis of elongation 144 of the lenslets, which may also correspond to the axis of elongation of the prisms 141, is shown to be parallel to the y-axis. In the case of the prisms 141, the elongation axis runs parallel to the vertex of the prism. The film 140 is shown to be adjacent the light guide 150 but spaced slightly apart. The film 140 may also be mounted or held so that it is in contact with the light guide 150, e.g. the film 140 may rest upon the light guide 150, while still substantially maintaining an air/polymer interface at the facets or inclined side surfaces of the prisms 141 (with a physically thin but optically thick layer of air) so that their refractive characteristics can be preserved. Alternatively, a low refractive index bonding material may be used between the prisms 141 and the light guide 150 to bond the film 140 to the light guide. In this regard, nanovoided materials having an ultra low index (ULI) of refraction are known that can come somewhat close in refractive index to air, and that can be used for this purpose. See e.g. patent application publications WO 2010/120864 (Hao et al.) and WO 2011/088161 (Wolk et al.), which discuss ULI materials whose refractive index (n) is in a range from about n≈1.15 to n≈1.35. See also patent application publications WO 2010/120422 (Kolb et al.), WO 2010/120468 (Kolb et al.), WO 2012/054320 (Coggio et al.), and US 2010/0208349 (Beer et al.). Air gap spacing techniques, e.g. wherein an array of microreplicated posts is used to bond the two components together while substantially maintaining an air gap between them, may also be used. See e.g. patent application publication US 2013/0039077 (Edmonds et al.).

The disclosed dual-sided optical films and associated components may be provided in a variety of forms and configurations. In some cases, the dual-sided optical film may be packaged, sold, or used by itself, e.g. in piece, sheet, or roll form. In other cases, the dual-sided optical film may be packaged, sold, or used with a light guide whose output beam characteristics are tailored for use with the dual-sided film. In such cases, the dual-sided film may be bonded to the light guide as discussed above, or they may not be bonded to each other. In some cases, the dual-sided optical film may be packaged, sold, or used with both a light guide that is tailored for use with the dual-sided film, and one or more LED(s) or other light source(s) that are adapted to inject light into the light guide, e.g., from opposite ends thereof as shown generally in FIG. 1A. The dual-sided film, the light guide, and the light source(s) may be bonded, attached, or otherwise held in proximity to each other to form a lighting module, which may be large or small, rigid or flexible, and substantially flat/planar or non-flat/non-planar, and which may be used by itself or in combination with other components. A lighting system that includes a dual-sided optical film, a light guide, and one or more light source(s) may be adapted for any desired end use, e.g., a display, a backlight, a luminaire, a task light, or a general-purpose lighting module.

Figure 2:
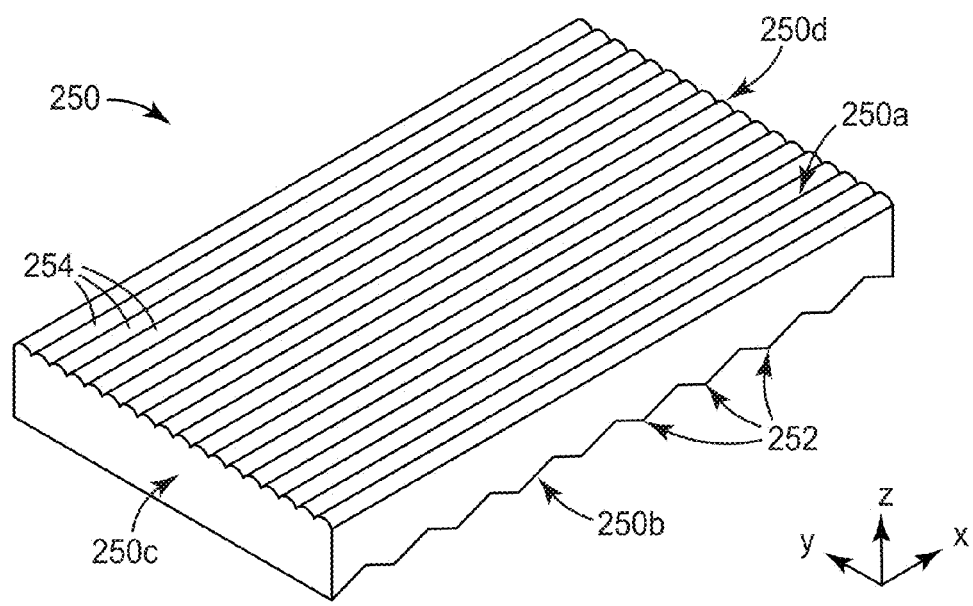
FIG. 2 is a schematic perspective view of a light guide, which shows in exaggerated fashion exemplary surface structure on the two major surfaces of the light guide.

FIG. 2 shows a schematic perspective view of an exemplary light guide 250 that may be suitable for use with some or all of the disclosed dual-sided optical films. The light guide 250 may be substituted for the light guide 150 in FIG. 1A, and the properties, options, and alternatives discussed in connection with the light guide 150 will be understood to apply equally to the light guide 250. Cartesian x-y-z coordinates are provided in FIG. 2 in a manner consistent with the coordinates of FIGS. 1A and 1B. FIG. 2 shows in exaggerated fashion exemplary surface structure on the two major surfaces of the light guide 250, but other orientations of the structured surface(s) relative to the edges of boundaries of the light guide can be used. The light guide 250 includes a first major surface 250a from which light is extracted towards a dual-sided optical film, a second major surface 250b opposite the first major surface, and side surfaces 250d, 250c which may serve as light injection surfaces for the first and second light sources as discussed elsewhere herein. For example, one light source may be positioned along the side surface 250c to provide a first oblique light beam emitted from the light guide 250, and a similar light source can be positioned along the side surface 250d to provide a second oblique light beam emitted from the light guide 250. An oblique light beam in this regard refers to a light beam whose intensity distribution in the x-z plane has a peak intensity direction of 60 degrees or more, or 70 degrees or more, or 80 degrees or more relative to the surface normal (z-axis), as discussed above.

The rear major surface 250b of the light guide is preferably machined, molded, or otherwise formed to provide a linear array of shallow prism structures 252. These prism structures are elongated along axes parallel to the y-axis, and are designed to reflect an appropriate portion of the light propagating along the length of the light guide (along the x-axis) so that the reflected light can refract out of the front major surface 250a into air (or a tangible material of suitably low refractive index) at a suitably oblique angle, and onward to the dual-sided optical film. In many cases, it is desirable for the reflected light to be extracted from the front major surface 250a relatively uniformly along the length of the light guide 250. The surface 250b may be coated with a reflective film such as aluminum, or it may have no such reflective coating. In the absence of any such reflective coating, a separate back reflector may be provided proximate the surface 250b to reflect any downward-propagating light that passes through the light guide so that such light is reflected back into and through the light guide. The prism structures 252 typically have a depth that is shallow relative to the overall thickness of the light guide, and a width or pitch that is small relative to the length of the light guide. The prism structures 252 have apex angles that are typically much greater than the apex angles of prisms used in the disclosed dual-sided optical films. The light guide may be made of any transparent optical material, typically with low scattering such as polycarbonate, or an acrylic polymer such as Spartech Polycast material. In one exemplary embodiment, the light guide may be made of acrylic material, such as cell-cast acrylic, and may have an overall thickness of 1.4 mm and a length of 140 mm along the x-axis, and the prisms may have a depth of 2.9 micrometers and a width of 81.6 micrometers, corresponding to a prism apex angle of about 172 degrees. The reader will understand that these values are merely exemplary, and should not be construed as unduly limiting.

The front major surface 250a of the light guide may be machined, molded, or otherwise formed to provide a linear array of lenticular structures or features 254 that are parallel to each other and to a lenticular elongation axis. In contrast to the elongation axis of the prism structures 252, the lenticular elongation axis is typically parallel to the x-axis. The lenticular structures 254 may be shaped and oriented to enhance angular spreading in the y-z plane for light that passes out of the light guide through the front major surface, and, if desired, to limit spatial spreading along the y-axis for light that remains in the light guide by reflection from the front major surface. In some cases, the lenticular structures 254 may have a depth that is shallow relative to the overall thickness of the light guide, and a width or pitch that is small relative to the width of the light guide. In some cases, the lenticular structures may be relatively strongly curved, while in other cases they may be more weakly curved. In one embodiment, the light guide may be made of cell-cast acrylic and may have an overall thickness of 0.76 mm, a length of 141 mm along the x-axis, and a width of 66 mm along the y-axis, and the lenticular structures 254 may each have a radius of 35.6 micrometers, a depth of 32.8 micrometers, and a width 323 of 72.6 mm, for example. In this embodiment, the prism structures 252 may have a depth of 2.9 micrometers, a width of 81.6 micrometers, and a prism apex angle of about 172 degrees. Again, the reader will understand that these embodiments are merely exemplary, and should not be construed as unduly limiting; for example, structures other than lenticular structures may be used on the front major surface of the light guide.

Figure 2A:
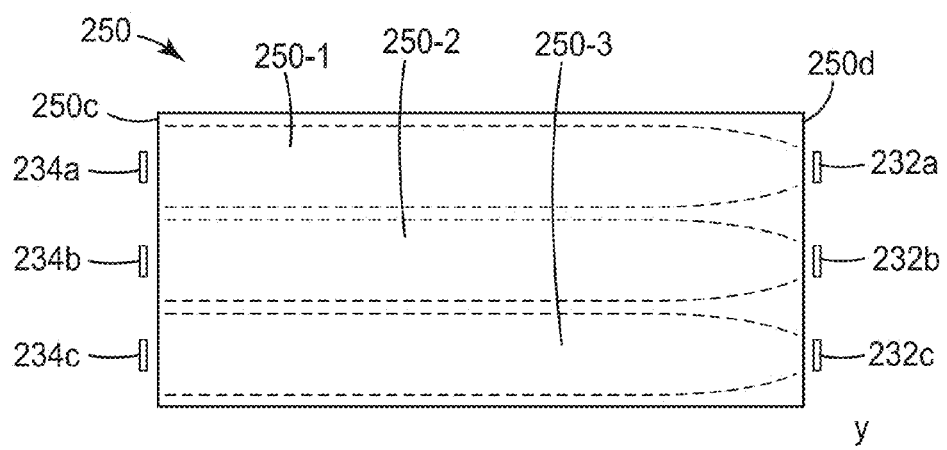

As mentioned above, the lenticular structures 254 may be shaped and oriented to limit spatial spreading along the y-axis for light that remains in the light guide by reflection from the front major surface. Limited spatial spreading along the y-axis can also be achieved, or enhanced, with light sources that are collimated (including substantially collimated) in the plane of the light guide, i.e., the x-y plane. Such a light source may be a relatively small area LED die or dies in combination with one or more collimating lenses, mirrors, or the like. FIG. 2A shows the light guide 250 of FIG. 2 in combination with light sources 232a, 232b, 232c arranged along side surface 250d, and light sources 234a, 234b, 234c arranged along side surface 250c. These light sources may be substantially collimated, or the lenticular structures 254 may be shaped to limit spatial spreading of light along the y-axis, or both. In the figure, the light sources 232a, 232b, 232c are shown as being ON, and the other light sources are OFF. Due to the collimation of the light sources, the shape of the lenticular structures 254, or both, the light sources 232a, 232b, 232c illuminate respective stripes or bands 250-1, 250-2, 250-3 of the light guide 250. The bands may be distinct, with little or no overlap as shown in the figure, or they may overlap to some extent. Each of the light sources may be independently addressable, such that the light guide can be effectively subdivided or partitioned as a function of which light sources on each side of the light guide are turned ON. For example, only one of the bands 250-1, 250-2, 250-3 may be illuminated, or only two may be illuminated, or all of the bands may be illuminated. Light sources 234a, 234b, 234c, which are located on the opposite side of the light guide, may be aligned with their counterpart light sources at side surface 250*d* such that they illuminate the same respective bands 250-1, 250-2, 250-3; alternately, the light sources 234*a*, 234*b*, 234*c* may be shifted or staggered along the y-direction relative to the light sources at side surface 250*d*, such that they illuminate other bands which may or may not overlap with each other in similar fashion to bands 250-1, 250-2, 250-3. The light sources 232*a*, 232*b*, 232*c*, 234*a*, 234*b*, 234*c* may all emit white light, or light of a non-white color or wavelength, or the light sources may emit different colors. A given portion of the light guide 250, such as any of the bands 250-1, 250-2, 250-3, may thus function as an independent light guide, and may emit at least two different output beams as a function of whether only its associated light source(s) at one side surface (e.g. surface 250*d*) is ON, or whether only its associated light source(s) at the opposite side surface (e.g. surface 250*c*) is ON, or whether both such light sources are ON. When a dual-sided optical film is used with such a light guide, the spatially banded or striped output capability of the light guide is substantially transferred to the dual-sided optical film, such that, by energizing the appropriate light source(s), the disclosed sharp-edged output beam(s) can emerge from the dual-sided optical film over all (all stripes or bands), or only a portion (at least one but less than all stripes or bands), or none (no stripes or bands) of its output surface.

Turning now to FIG. 3, we see there a schematic side view of a lighting system 300 in the context of a coordinate system that is consistent with that of FIGS. 1A, 1B, and 2. System 300 may be the same as or similar to the backlight 130 of FIGS. 1A and 1B, except that the controller 170 in FIG. 3 is not coupled to any display panel, and the light guide 150 of FIG. 3 may have a design substantially as described in connection with light guide 250 of FIG. 2. Other than this, like elements are labeled with like reference numbers, and need not be discussed further. Furthermore, in FIG. 3, only the light source 134 is energized (ON), and the light source 132 is not energized (OFF). Due to the characteristics of the light guide 150, the characteristics of the optical film 140, and the interaction between the light guide and the optical film, light from the light source 134 produces a first output beam 310 emerging from the dual-sided optical film, the first output beam 310 having an angular distribution in the x-z plane characterized by sharp transitions or edges on both of its sides.

Light from the energized light source 134 enters the light guide 150 through the first side 150*c*. This light travels along the light guide 150 generally in the positive x-direction, the light reflecting from the major surfaces 150*a*, 150*b* to provide a first guided light beam 134-1. As the beam 134-1 propagates, some of the light is refracted or otherwise extracted from the major surface 150*a* to provide an oblique light beam 134-2, represented by obliquely oriented arrows representing a direction of maximum light intensity in the x-z plane. The oblique light beam 134-2 is typically emitted over substantially the entire surface area of the major surface 150*a*, i.e., not only in the geometric center of the major surface 150*a* but also at or near its edges and at intermediate positions in between, as indicated by the multiple oblique arrows. The oblique light beam 134-2 has a direction of maximum light intensity that is most closely aligned with the positive x-direction. The direction of maximum light intensity of the beam 134-2 may deviate from the positive x-direction by, for example, 30 degrees or less, or 20 degrees or less, or 15 degrees or less, or 10 degrees or less.

Because of the directionality of the oblique light beam 134-2, light from the light source 134 enters the dual-sided optical film 140 predominantly through only one inclined side surface of each of the prisms 141 on the lower structured surface of the film 140. However, such inclined side surface may be a compound surface having at least a distinct tip portion, base portion, and intermediate portion as described below. Refraction provided by such compound surfaces, in cooperation with reflection provided at the other inclined surface of the prisms, and in cooperation with refraction provided by the lenslets, causes light to emerge from the film 140 as the first output beam 310. The output beam 310 arises from the summation of individual output beams or "beamlets" emitted from each lenslet 142 across the film 140. Three such representative beamlets are illustrated in FIG. 3: a beamlet 310-0 emitted at or near the geometric center of the film 140, a beamlet 310-1 emitted at or near a first end or edge of the film 140, and a beamlet 310-2 emitted at or near a second end or edge of the film 140. In the illustrated embodiment, the angular spreads or widths of the individual beams or beamlets are nominally the same as the angular spread or width of the overall output beam 310, because the angular distributions of the beamlets may all be substantially the same. In other embodiments, the angular spread of the individual beams or beamlets may differ somewhat from that of the overall output beam 310.

Figure 4A:
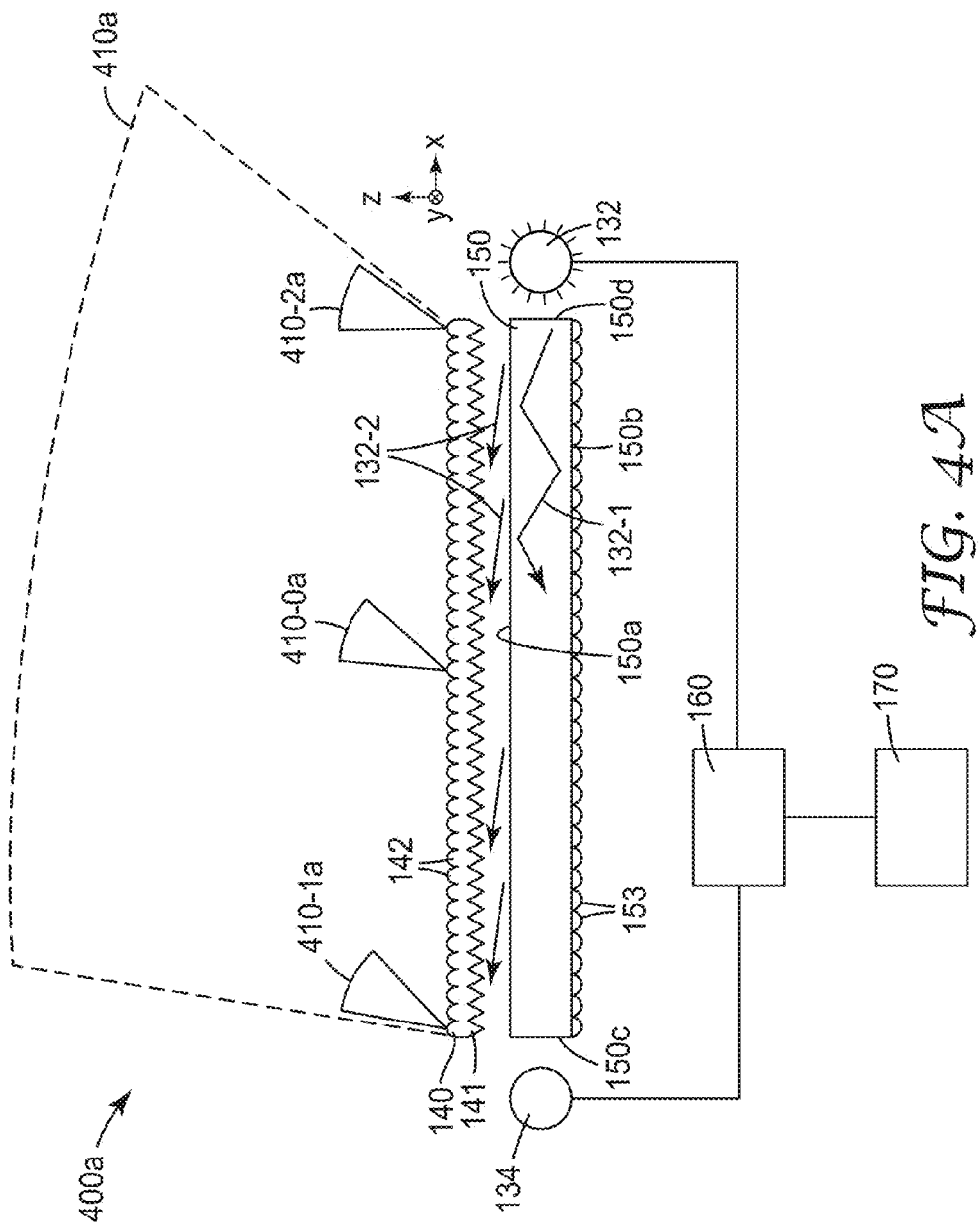
FIG. 4A is a schematic side view of the lighting system of FIG. 3 but with the opposite light source energized, this light source producing a second output beam emerging from the dual-sided optical film, the second output beam also having two sharp transitions or edges.
Figure 4B:
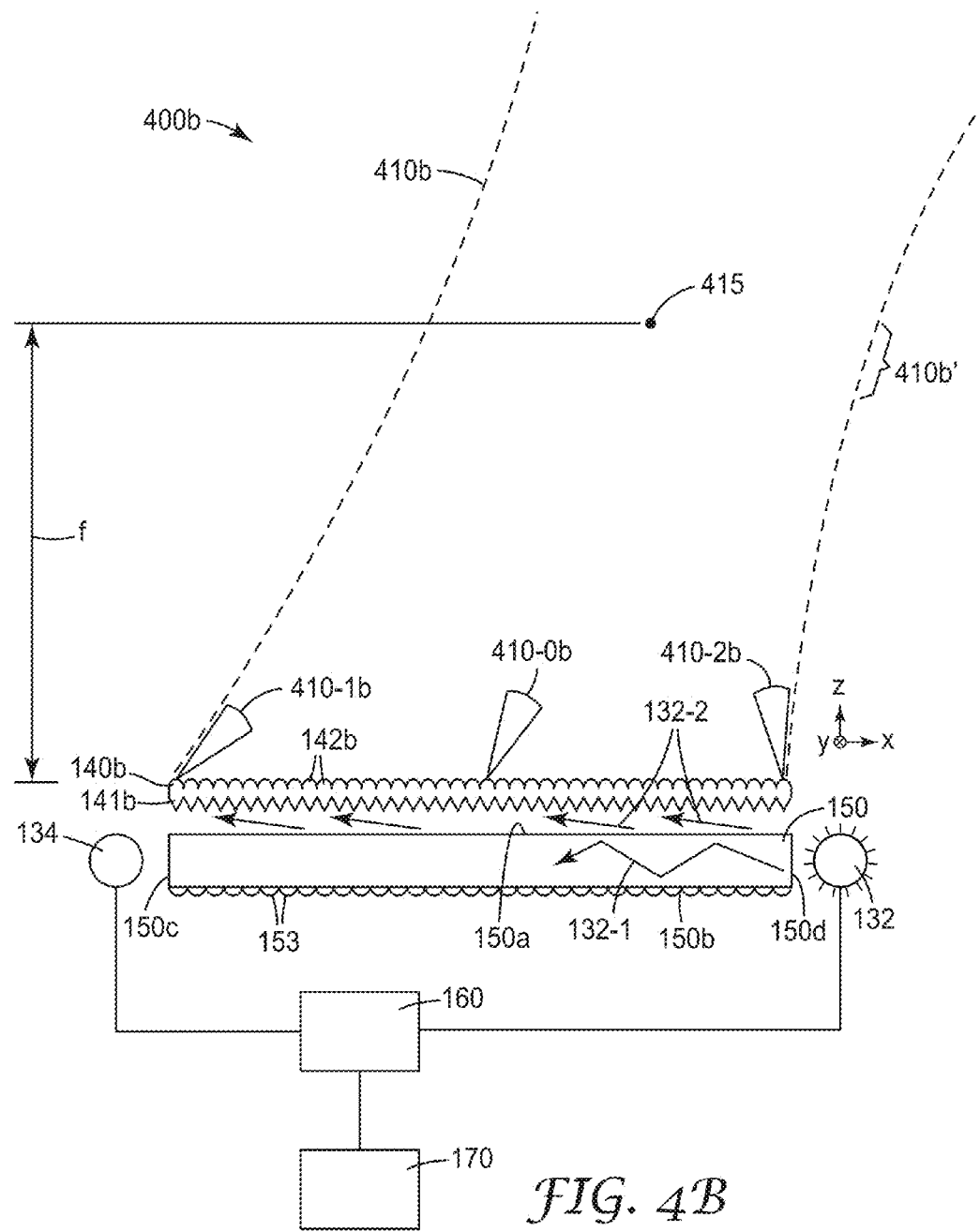
FIG. 4B is a schematic side view of a lighting system similar to FIG. 4A but where the dual-sided optical film is modified to produce a modified second output beam, which has a beam waist in addition to the sharp edges.

If the first light source 134 is turned OFF and the second light source 132 is turned ON, the system 300 produces a second output beam, which is also characterized by an angular distribution with two sharp edges. The second output beam typically covers a different angular range than the first output beam, and the angular distributions of the two output beams may overlap or they may not overlap. FIG. 4A shows a typical second output beam that may be produced in a manner consistent with the first output beam of FIG. 3, with the same dual-sided optical film. FIG. 4B shows an alternative second output beam that may be produced by modifying the design of the dual-sided optical film.

Thus, in FIG. 4A, a lighting system 400*a* is shown in the context of a coordinate system consistent with that of FIG. 3. The system 400*a* may be the same as or similar to the lighting system 300, except that the light source 134 is not energized (OFF), and the light source 132 is energized (ON). Due to the characteristics of the light guide 150, the characteristics of the dual-sided optical film 140, and the interaction between the light guide and the optical film, light from the light source 132 produces a second output beam 410*a* emerging from the optical film, the second output beam 410*a* having a different angular distribution in the x-z plane and propagating in a different direction than the first output beam 310 of FIG. 3.

Light from the energized light source 132 enters the light guide 150 through the second side 150*d*. This light travels along the light guide 150 generally in the negative x-direction, the light reflecting from the major surfaces 150*a*, 150*b* to provide a first guided light beam 132-1. As the beam 132-1 propagates, some of the light is refracted or otherwise extracted from the major surface 150*a* to provide an oblique light beam 132-2, represented by obliquely oriented arrows representing a direction of maximum light intensity in the x-z plane. The oblique light beam 132-2 is typically emitted over substantially the entire surface area of the major surface 150*a*, i.e., not only in the geometric center of the major surface 150*a* but also at or near its edges and at intermediate positions in between, as indicated by the multiple oblique arrows. The oblique light beam 132-2 has a direction of maximum light intensity that is most closely aligned with the negative x-direction. The direction of maximum light intensity of the beam 132-2 may deviate from the negative x-direction by, for example, 30 degrees or less, or 20 degrees or less, or 15 degrees or less, or 10 degrees or less.

Because of the directionality of the oblique light beam 132-2, light from the light source 132 enters the dual-sided optical film 140 predominantly through only a second inclined side surface of each of the prisms 141 on the lower structured surface of the film 140, this second inclined surface being the opposite of the inclined surface used in connection with FIG. 3. The second inclined side surface may also be a compound surface having at least a distinct tip portion, base portion, and intermediate portion as described below. Refraction provided by the compound second inclined surfaces, in cooperation with reflection provided at the other inclined surface of the prisms, and in cooperation with refraction provided by the lenslets, causes light to emerge from the film 140 as the second output beam 410a. The output beam 410a arises from the summation of individual output beams or "beamlets" emitted from each lenslet 142 across the film 140. Three such representative beamlets are illustrated in FIG. 4A: a beamlet 410-0a emitted at or near the geometric center of the film 140, a beamlet 410-1a emitted at or near a first end or edge of the film 140, and a beamlet 410-2a emitted at or near a second end or edge of the film 140. In the illustrated embodiment, the angular spreads or widths of the individual beams or beamlets are nominally the same as the angular spread or width of the overall output beam 310, because the angular distributions of the beamlets may all be substantially the same.

In the alternative embodiment of FIG. 4B, the angular spread of the individual beams or beamlets differ from that of the overall output beam, because the angular distributions of the beamlets change over the surface of the dual-sided film. That is, the angular distribution of a beamlet at the center of the film is different from that of a beamlet at one end or extremity of the film, which in turn is different from that of a beamlet at the other end or extremity of the film. This non-uniformity of beamlet direction may be achieved by replacing the optical film 140 of FIGS. 3 and 4a with a modified optical film 140b. The film 140b may be similar to film 140 by again having extended compound prisms 140b formed in the first structured surface and extended lenslets 142b formed in the second structured surface, but may differ from film 140 by modifying the prism pitch and/or the lenslet pitch to be different from each other, and/or by tailoring the prisms 140b and/or lenslets 142b to have degrees of tilt or rotation that change over the surface of the film. The non-uniform beamlet directions as a function of position also produce an overall output beam that has a converging characteristic, with a beam waist or minimum beam diameter or dimension located a finite distance away from the optical film. (Note that with the modified film 140b, the output beam produced by turning the light source 132 OFF and the light source 134 ON would also typically have a converging characteristic, or, at least, would also have non-uniform beamlet directions as a function of position on the film.)

Thus, in FIG. 4B, a lighting system 400b is shown in the context of a coordinate system consistent with that of the previous figures. The system 400 may be similar to the lighting system 300, except that the dual-sided optical film 140 is replaced by the modified optical film 140b, and the light source 134 is not energized (OFF) while the light source 132 is energized (ON). Due to the characteristics of the light guide 150, the characteristics of the optical film 140b, and the interaction between the light guide and the optical film, light from the light source 132 produces the second output beam 410b emerging from the dual-sided optical film, the second output beam 410b also having an angular distribution in the x-z plane characterized by sharp transitions or edges on both of its sides.

Just as in FIG. 4A, light from the energized light source 132 enters the light guide 150 through the second side 150d. This light travels along the light guide 150 generally in the negative x-direction, the light reflecting from the major surfaces 150a, 150b to provide a first guided light beam 132-1. As the beam 132-1 propagates, some of the light is refracted or otherwise extracted from the major surface 150a to provide the oblique light beam 132-2, which may be the same as or similar to the oblique light beam 132-2 of FIG. 4A, described above.

Because of the directionality of the oblique light beam 132-2, light from the light source 132 enters the dual-sided optical film 140b predominantly through only a second inclined side surface of each of the prisms 141b on the lower structured surface of the film 140, this second inclined surface being the opposite of the inclined surface used in connection with FIG. 3. The second inclined side surface may also be a compound surface having at least a distinct tip portion, base portion, and intermediate portion as described below. Refraction provided by the compound second inclined surfaces, in cooperation with reflection provided at the other inclined surface of the prisms, and in cooperation with refraction provided by the lenslets, causes light to emerge from the film 140b as the second output beam 410b. The output beam 410b arises from the summation of individual output beams or "beamlets" emitted from each lenslet 142b across the film 140b. Three such representative beamlets are illustrated in FIG. 4B: a beamlet 410-0b emitted at or near the geometric center of the film 140b, a beamlet 410-1b emitted at or near a first end or edge of the film 140b, and a beamlet 410-2b emitted at or near a second end or edge of the film 140b. In the illustrated embodiment, the beamlets 410-0b, 410-1b, 410-2b are oriented in different directions as shown, which results in the second output beam 410b being converging as it emerges from the film 140. The second beam 410b achieves a minimum beam width (for the light distribution in the x-z plane) at a beam waist 410b', beyond which the beam 410b diverges. The beam waist 410b' can be compared to the focal point of a lens, and we may define a distance f as the axial distance from the film 140 to the beam waist 410b', or to a point 415 centrally located within the beam waist 410b'. We can tailor the distance f by controlling the spread angles and the tilt angles of the beamlets produced by the compound prism/lenslet pairs, by in turn controlling the relative pitches and/or distribution of tilt angles of the prisms 141b and lenslets 142b across the film 140b, discussed further below.

Figure 5:
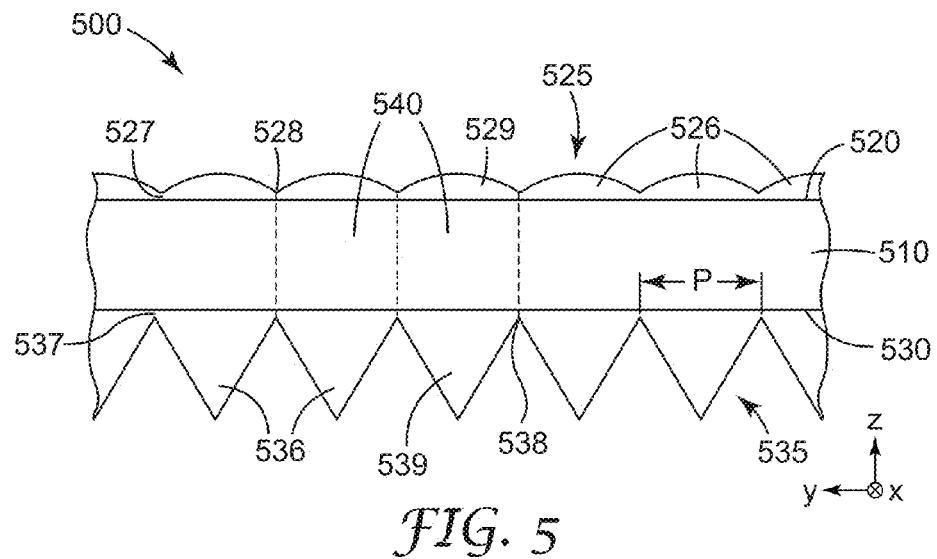
FIG. 5 is a schematic side or sectional view of a known 3D light redirecting film.
Figure 5A:
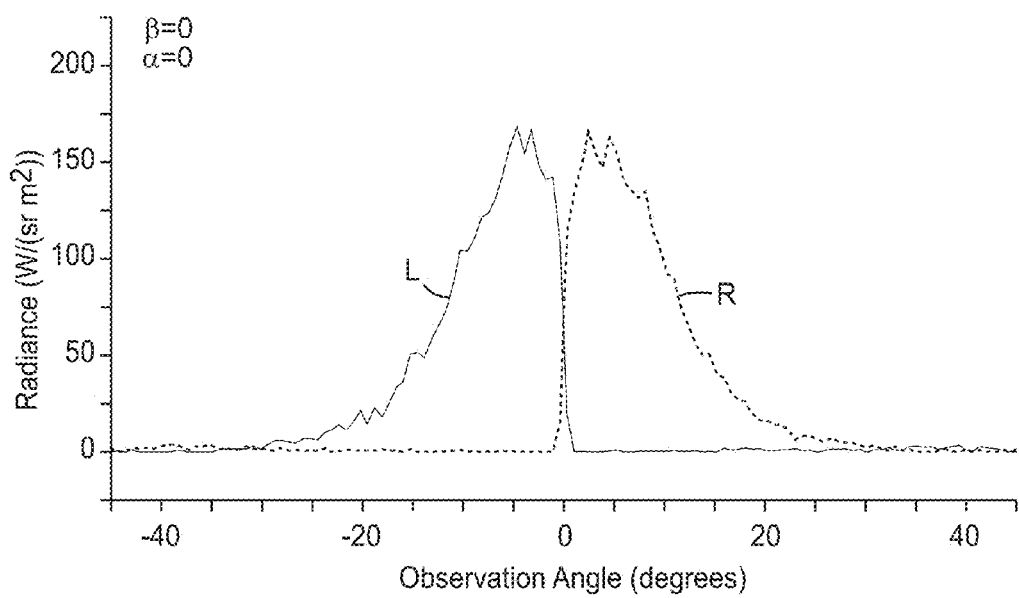
FIG. 5A is a graph of modeled radiance versus observation angle for light emitted from a portion of a known light redirecting film portion having identical lenticular features with compound curvature and also having corresponding identical prismatic features, the lenticular features having no tilt ($\alpha=0$) and the prismatic features also having no tilt ($\beta=0$)

In order to appreciate some of the unique characteristics of the output beams produced by the disclosed dual-sided films, i.e., that the output beams have sharp angular transitions or edges on both sides thereof, we include here for comparison purposes FIGS. 5 and 5A. FIG. 5 is a schematic view of a known 3D light redirecting film, and FIG. 5A is a graph of modeled radiance versus observation angle for light emitted from a portion of a known light redirecting film portion having identical lenticular features with compound curvature, and also having corresponding identical prismatic features, the lenticular features having no tilt ($\alpha$=0) and the prismatic features also having no tilt ($\beta$=0). These figures are taken substantially from patent application publication US 2012/0236403 (Sykora et al.). The prismatic features thereof do not have compound inclined surfaces.

In FIG. 5, a 3-dimensional (3D) light redirecting film 500 for use in auto stereoscopic display systems is shown. The film 500 includes a web 510 substrate having opposed first and second surfaces 520, 530. Applied to these first and second surfaces 520, 530 are first and second microreplicated structures 525, 535, respectively. The first microreplicated structure 525 includes a plurality of arcuate or lenticular features 526, which may be cylindrical lenses. The second microreplicated structure 535 includes a plurality of sawtooth or pyramidal prismatic features 536. These prismatic features do not have compound inclined surfaces.

The first and second features 526, 536 have the same pitch or period of repetition P. The features shown are of indefinite length along the in-plane x-axis. (In this regard, the Cartesian x-y-z coordinate system shown in FIG. 5 is different from the coordinate system orientations shown elsewhere herein, since in FIG. 5 the x-axis, rather than the y-axis, is parallel to the elongation axes of the prisms and lenslets.) Opposed microreplicated features 526, 536 are paired or matched to form a plurality of optical elements 540. The performance of each optical element 540 is a function of the alignment of the respective opposed features 529, 539. The film 500 may in some cases include first and second land portions 527, 537. Further details of the film 500 can be found in the '403 Sykora et al. publication.

FIG. 5A is a graph of the modeled performance of a dual-sided optical film of the type shown in FIG. 5. The lenticular features and the prismatic features of the optical film were both assumed to have no rotation or tilt, i.e., $\alpha=\beta=0$. The modeling generated two different input light beams that were obliquely incident on the prism side of the optical film, and calculated the angular distribution of the corresponding output beams produced by the optical film. Further details of the optical film, and details of the oblique light injection used by the model, can be found in the '403 Sykora et al. publication. The modeling results are shown in FIG. 5A, where "L" identifies a "left eye beam" emitted from the 3D film and "R" identifies the "right eye beam" emitted from the 3D film. Note that each of these output beams do not have two sharp transitions, i.e. neither output beam has sharp transitions on both sides of the beam.

We will now discuss design details of exemplary dual-sided optical films that allow the films to produce output beams, such as those shown in FIGS. 3 through 4B, whose angular distributions in a particular plane of observation have sharp transitions or edges on both sides of the output beam. In general, such films have opposed first and second structured surfaces, the first structured surface having a plurality of extended prisms formed therein, and the second structured surface having a plurality of extended lenslets formed therein. The prisms and the lenslets are arranged in a one-to-one correspondence of prisms to lenslets. Significantly, all, or most, or at least some of the prisms formed in the first structured surface are compound prisms. A compound prism is a prism whose opposed inclined surfaces are compound, i.e., each such inclined surface has a distinct tip portion, base portion, and intermediate portion, the intermediate portion being disposed between the tip portion and the base portion. The compound prism also has a sharp vertex, formed by the tip portions of its two inclined surfaces. For a given inclined surface of the compound prism, the intermediate portion forms a first profile shape with the tip portion and a second profile shape with the base portion. To achieve the desired output beam with two sharp edges, the slopes or inclinations of the various portions are selected such that either the first profile shape is concave and the second profile shape is convex, or the first profile shape is convex and the second profile shape is concave.

The structured surfaces of the films can be made using any known microreplication techniques, e.g. by embossing or thermoforming a polymer film, or using continuous cast-and-cure methods. In the latter case, a curable polymer material or polymer precursor material may be applied between a transparent carrier film and a suitably configured structured surface tool. The material is then cured and separated from the tool to provide a layer that is bonded to the carrier film and has the desired microstructured topography. One such layer can be applied on one side of the carrier film to form the compound prisms (see e.g. prisms 141 in FIG. 3), and another such layer can be applied on the opposite side of the carrier film to form the lenslets (see e.g. lenslets 142 in FIG. 3). To the extent microreplication techniques are used in the fabrication of the film, they are desirably employed in such a manner that the relative positions of elements on opposite structured surfaces of the film, e.g. a given lenslet and a given prism, may be controlled, and so that the axial distance between them can also be controlled e.g. by appropriate selection of film thicknesses and coating thicknesses. Reference is made to patent application publication US 2005/0052750 (King et al.), which describes among other things how microreplicated structures can be made in alignment on opposite sides of an article. The dual-sided optical films may be made using a carrier film made from polyethylene terephthalate (PET), polycarbonate, or any other suitable light-transmissive polymer(s) or other material(s).

The structured surfaces of the disclosed dual-sided optical films, as well as the structured surfaces of the disclosed light guides, can alternatively or in addition be made using known additive manufacturing techniques, sometimes referred to as three-dimensional printing or 3D printing.

Figure 6:
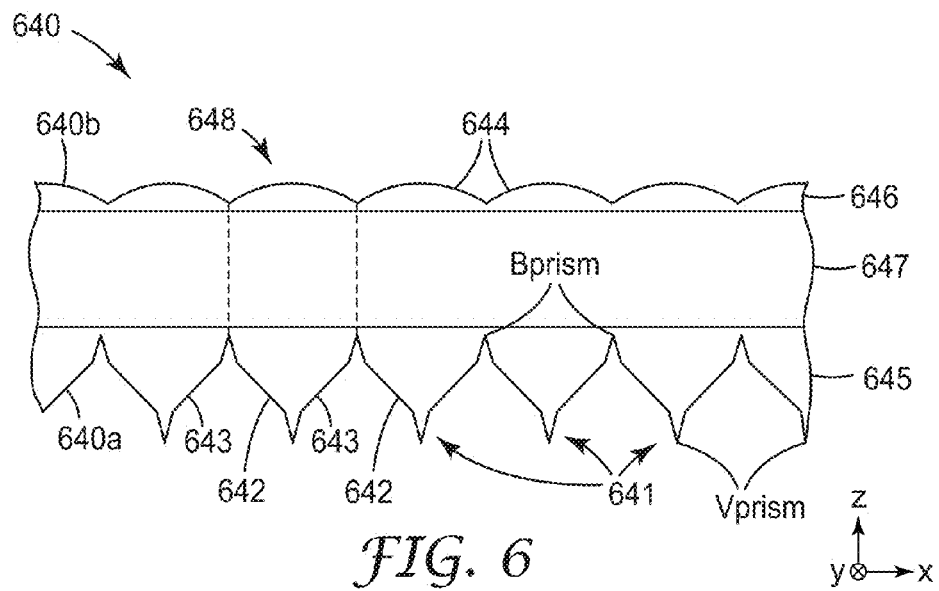
FIG. 6 is a schematic side or sectional view of a portion of a dual-sided optical film that includes elongated lenslets and elongated compound prisms.

FIG. 6 is a schematic view of a portion of one exemplary dual-sided optical film 640. This film has opposed first and second structured surfaces 640a, 640b. The film 640 is shown in relation to a Cartesian x-y-z coordinate system which is consistent with the coordinates in the previous figures other than FIG. 5. The first structured surface 640a has a plurality of prisms 641 formed therein. The prisms 641 each extend along an elongation axis parallel to the y-axis. Each prism 641 has two inclined side surfaces 642, 643, which meet at the peak or vertex of the prism, labeled Vprism. Inclined surfaces of adjacent prisms 641 meet at the base of the prism, labeled Bprism. Thus, each inclined surface extends from one base point Bprism to one vertex Vprism. The bases of the prisms are shown in FIG. 6 as being pointed or v-shaped; however, non-pointed and non-v-shaped profiles, e.g., truncated profiles, can also be used. Each prism 641 has a sharp vertex characterized by a vertex angle. Typical vertex angles are in a range from 50 to 90 degrees, e.g., 63.5 degrees, but this should not be construed as unduly limiting. Regardless of the vertex angle, the vertex is sharp rather than truncated or rounded, e.g., having a radius of curvature of no more than 3 microns, or no more than 2 microns, or no more than 1 micron. The inclined side surfaces 642, 643 in FIG. 6 are all shown as having a compound configuration, i.e., each such surface has distinguishable tip, base, and intermediate portions of distinctly different slope or inclination, with the intermediate portion having a different slope or inclination than that of the tip portion and base portion so as to form separate concave and convex profile shapes with those two portions. In isolation, the distinct portions (e.g. tip, base, intermediate) of the inclined surfaces 642, 643 may each be flat or non-flat, e.g., somewhat curved. The prisms 641 may collectively be characterized by a pitch p1 (see e.g. FIG. 15 or 16 below). The pitch may be measured center-to-center, or from edge-to-edge of adjacent prisms. The pitch is typically uniform over the extent of the structured surface 640a, but in some cases it may not be uniform. Further details of compound prisms are discussed below in connection with FIG. 8 and following.

The second structured surface 640b has a plurality of lenslets 644 formed therein. These too extend along elongation axes that are parallel to the y-axis. The lenslets 644 may have a single, uniform curvature, i.e. the curved surface of each lenslet may be a portion of a right circular cylinder, or they may have a non-uniform curvature, e.g., a continuously variable curvature with a smaller radius of curvature in a central portion and greater radius of curvature near the edges, or vice versa. A lenslet that has a non-uniform curvature is said to have a compound curvature. The lenslets 644 may collectively be characterized by a pitch p2 (see e.g. FIGS. 15 and 16 below). The pitch may be measured center-to-center, or from edge-to-edge of adjacent lenslets. The pitch is typically uniform over the extent of the structured surface 640b, but in some cases it may not be uniform. The pitch p2 may equal p1, whereupon the degree of registration of the lenslets 644 to the prisms 641 remains constant or substantially constant over the relevant area of the film 640 along the x-axis. Alternatively, p2 may be slightly greater than or less than p1, whereupon the degree of registration of the lenslets 644 to the prisms 641 changes over the relevant area of the film 640 along the x-axis.

The film 640 is shown to include three constituent layers or elements 645, 646, 647, although more or fewer layers are also contemplated. The layer 647 may be a carrier film, and layers 645, 647 may be layers that are bonded to the carrier film e.g. using a casting-and-curing procedure or other suitable procedure. The film 640 and its constituent layers are assumed to comprise substantially transparent materials of high optical transmission and low absorption throughout the visible spectrum, although in some cases the film 640, or one or more of its constituent layers, may include dye(s), pigment(s), and/or other absorptive agent(s) to provide colored and/or grayscale tint(s) to the film 640. Exemplary materials for use in the film are light-transmissive polymer materials, however, other suitable light-transmissive materials may also be used. The film and/or some or all of its constituent components may have a refractive index for visible wavelengths in a range from 1.4 to 1.7, or from 1.5 to 1.7 (e.g. a refractive index of 1.67 for the carrier film and 1.51 for resin that forms layers 646 and/or 645), but these ranges should be considered exemplary and not unduly limiting.

Figure 6A:
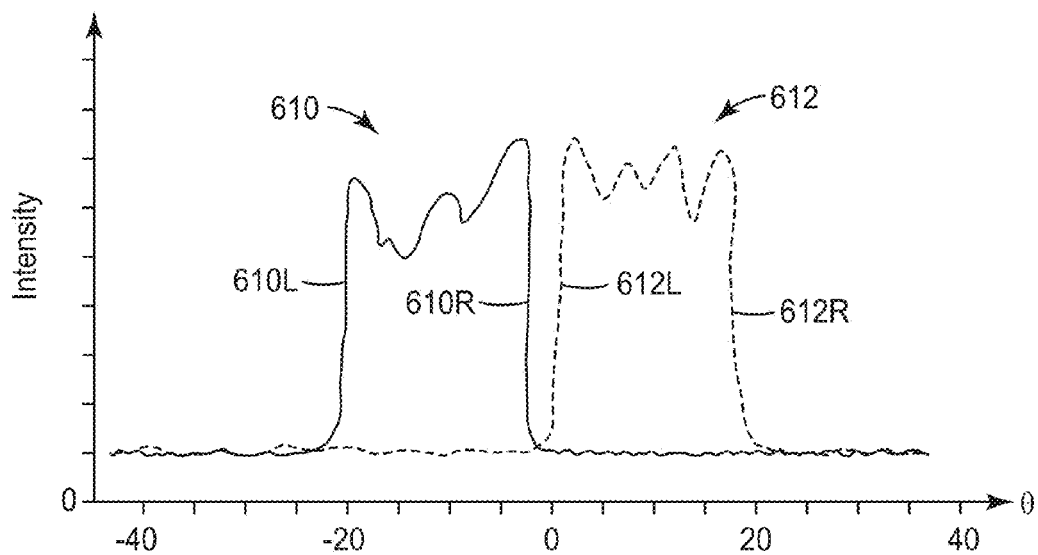
FIG. 6A is an angular distribution plot of two hypothetical output beams that may be produced by an optical film such as that of FIG. 6, the angular distributions being associated with a particular plane of observation.

FIG. 6A is an angular distribution plot of two hypothetical output beams that may be produced by a dual-sided optical film such as that of FIG. 6. The plot represents the angular distribution of light emitted by the film 640 in the x-z plane of observation, as a function of the polar angle θ which is measured relative to an axis orthogonal to the plane of the film, i.e., relative to the z-axis, and with respect to a suitable reference point on the pertinent portion of the film, e.g. a centrally located point on the structured surface 640b. The solid curve represents the light emitted by the film 640 when it is coupled to a source of oblique light traveling in a first direction, e.g., when coupled to the light guide 250 of FIG. 2 with light sources disposed at opposite ends thereof, and with a first light source turned ON and a second light source turned OFF. The dashed curve represents the light emitted by the film 640 when it is coupled to a source of oblique light traveling in a second direction (e.g. opposite the first direction), e.g., when coupled to the light guide 250 of FIG. 2 with the first light source turned OFF and a second light source turned ON. As can be readily seen from the figure, the solid curve defines a first output beam 610 and the dashed curve defines a second output beam 612. Each of these beams has two sharp transitions or edges, which for convenience are referred to as a left beam edge and a right beam edge. Thus, beam 610 has a left beam edge 610L and a right beam edge 610R, and beam 612 has a left beam edge 612L and a right beam edge 612R. The beam edges on both sides of each output beam are sharp as a function of angle θ in the x-z plane.

Figure 7:
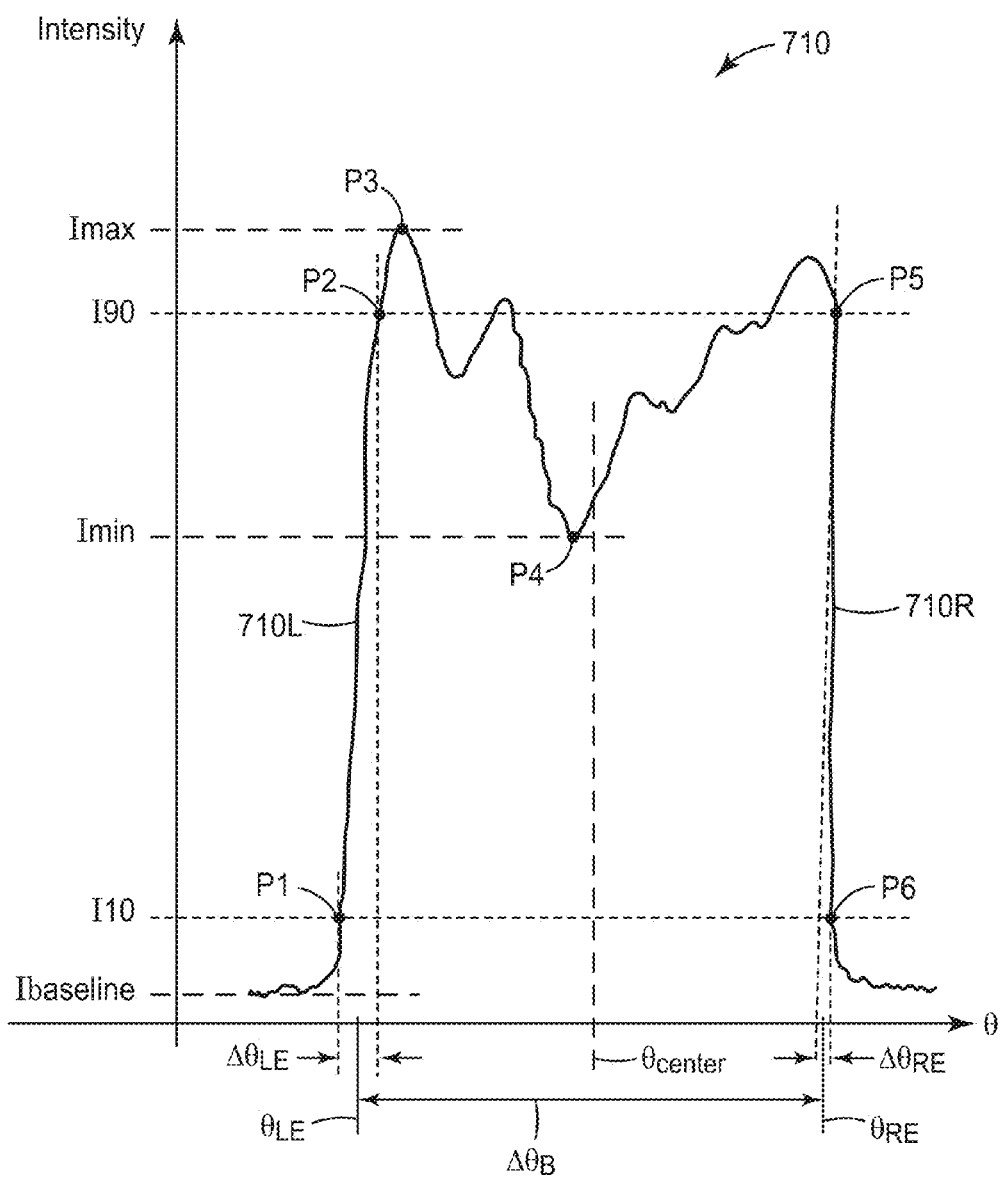
FIG. 7 is an angular distribution plot similar to that of FIG. 6 but for one hypothetical output beam that may be produced by any of the disclosed optical films, the plot illustrating angle-related beam features such as beam edge sharpness and beam (angular) width.

In order to quantify the concept of "sharpness" of a beam edge for purposes of this application, and to clarify other concepts relating to an output light beam, we turn to FIG. 7. That figure shows the angular intensity distribution (intensity versus polar angle θ) in a plane of observation perpendicular to the elongation axis of the prisms 641, i.e., in the x-z plane, for light emitted by a hypothetical dual-sided optical film as disclosed herein. The light intensity defines an output beam 710, having a left beam edge 710L and a right beam edge 710R. The output beam 710 is characterized by a single contiguous band (along the polar angle axis) of increased intensity relative to a background or baseline intensity. The baseline intensity, which is labeled Ibaseline in the figure, may or may not be zero intensity. The output beam 710 has a maximum in-band intensity Imax, and a minimum in-band intensity Imin. The left edge of the output beam 710 is deemed to occur at a left edge polar angle $\theta_{LE}$, and the right edge of the output beam 710 is deemed to occur at a right edge polar angle $\theta_{RE}$. These edge angles $\theta_{LE}$ and $\theta_{LE}$ are described further below. The edge angles can be used to define a central or center angle $\theta_{CENTER}$ of the beam 710, as well as an angular spread or width $\Delta\theta_B$ of the beam 710. The sharpness of the left and right beam edges are defined respectively by the differential values $\Delta\theta_{LE}$ and $\Delta\theta_{RE}$.

In order to define these various angular parameters, we perform the following analysis on the intensity distribution of FIG. 7. We identify the baseline intensity Ibaseline and the maximum intensity Imax. We then determine the intensity values that are 10% and 90% between Ibaseline and Imax, and we refer to and label these values I10 and I90 respectively. Thus, I10=Ibaseline+0.1*(Imax−Ibaseline), and I90=Ibaseline+0.9*(Imax−Ibaseline). These are drawn on the graph of FIG. 7. Also included in FIG. 7 are six points on the intensity distribution curve that are relevant to our characterization of the output beam: point P1 is the point on the left side of the beam where the intensity equals I10; point P2 is the point on the left side of the curve where the intensity equals I90; point P3 is the point of maximum intensity (Imax) of the beam; point P4 is the point of minimum intensity (Imin), between the left and right band edges; point P5 is the point on the right side of the beam where the intensity equals I90; and point P6 is the point on the right side of the beam where the intensity equals I10. With these points of the intensity distribution identified, we can define the sharpness of the beam edges. The sharpness of the left beam edge is provided by the differential value $\Delta\theta_{LE}$, which we set equal to the difference in angle θ between the points P1 and P2. The parameter $\Delta\theta_{LE}$ is thus essentially a measure of how far apart in polar angle are the 10% and 90% intensity levels at the left beam edge. Also, we set the angular coordinate of the left beam edge, $\theta_{LE}$, equal to the angle halfway between the angular coordinates of points P1 and P2. The sharpness of the right beam edge is provided by the differential value $\Delta\theta_{RE}$, which we set equal to the difference in angle θ between the points P5 and P6. The parameter $\Delta\theta_{LE}$ is essentially a measure of how far apart in polar angle are the 10% and 90% intensity levels at the right beam edge. We set the angular coordinate of the right beam edge, $\theta_{RE}$, equal to the angle halfway between the angular coordinates of points P5 and P6. We set the center angle $\theta_{CENTER}$ equal to the angle halfway between the left and right beam edge angles, $\theta_{LE}$ and $\theta_{RE}$, and we set the beam width $\Delta\theta_B$ equal to the difference between $\theta_{LE}$ and $\theta_{RE}$.

With these parameters so defined, we may quantify our concept of "sharp" beam edges by specifying that each of $\Delta\theta_{LE}$ and $\Delta\theta_{LE}$ is 7 degrees or less, or 6 degrees or less, or 5 degrees or less, or 4 degrees or less, or 3 degrees or less, or 2 degrees or less, or in a range from 7 to 1, or 6 to 1, or 5 to 1, or 4 to 1, or 3 to 1, or 2 to 1, or 7 to 2, or 6 to 2, or 5 to 2, or 4 to 2, or 3 to 2 degrees. Also, to avoid misinterpreting separate, angularly separated beams as a single beam, we may specify that the minimum in-band intensity Imin be at least equal to Ibaseline+20%*(Imax−Ibaseline), or at least Ibaseline+ 30%*(Imax−Ibaseline), or at least Ibaseline+40%*(Imax− Ibaseline). We may further specify that the beam width $\Delta\theta_B$ is at least 10, or 20, or 30 degrees, or in a range from 10 to 40 degrees.

Figure 8:
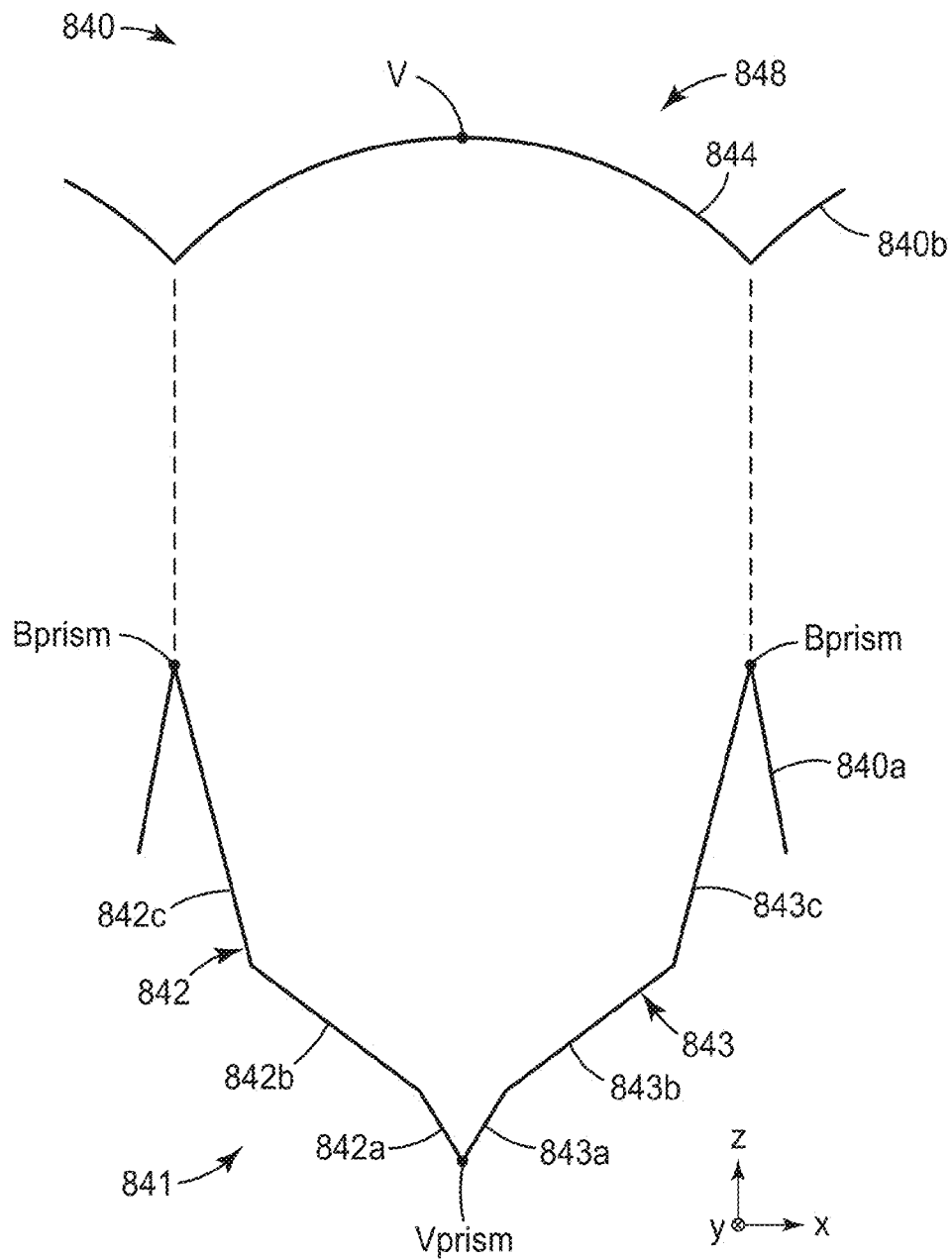
FIG. 8 is a schematic side or sectional view of a portion of a dual-sided optical film having the same or similar design as that of FIG. 6, this view showing one compound prism/lenslet pair.

In FIG. 8 we show a schematic view of a portion of a dual-sided optical film 840 which may be the same as, or similar to, the film 640 of FIG. 6. The view of FIG. 8 is enlarged compared to that of FIG. 6 to allow closer inspection of a single compound prism/lenslet pair, labeled 848, which is assumed to be immersed in air. The Cartesian coordinate system of FIG. 8 is consistent with the coordinates in the previous figures other than FIG. 5. The film 840 is shown to be unitary, but it may alternatively have the layered construction of FIG. 6, or a different layered construction. The film 840 has a first structured surface 840a with a plurality of prisms 841 formed therein. The surface 840a and prism 841 may be the same as the respective structured surface 640a and prism 641 discussed above. In that regard, the prism 841 has two inclined side surfaces or facets 842, 843, which may be the same as respective inclined surfaces 642, 643 discussed above. The surfaces 842, 843 intersect to form a sharp prism vertex Vprism, which vertex may be a line or ridge extending parallel to the y-axis. The surfaces 842, 843 also intersect with other inclined surfaces of adjacent prisms to form base points, labeled Bprism. The inclined surfaces 842, 843 thus each extend from one of the base points Bprism to the vertex Vprism.

The inclined side surfaces 842, 843 moreover have a compound configuration, i.e., these surfaces have distinguishable tip portions 842a, 843a, base portions 842c, 843c, and intermediate portions 842b, 843b as shown. For each inclined surface, these different portions have distinctly different slopes or inclinations, and in each case the intermediate portion has a slope or inclination that is either smaller or larger than those of its adjacent tip portion and base portion. By a "smaller" slope or inclination, we mean that the intermediate portion is more nearly parallel to the plane of the film (the x-y plane) than its adjacent tip portion and base portion, or that the included angle between the intermediate portion and the plane of the film is less than the included angle between the tip portion and the plane of the film, and less than the included angle between the base portion and the plane of the film. A "larger" slope or inclination refers to the opposite situation. In isolation, the distinct tip, base, and intermediate portions shown in FIG. 8 are each substantially flat. The characteristic vertex angle of the prism 841 is thus defined by the intersection of the tip portions 842a, 843a. The vertex is sharp, e.g., having a radius of curvature of no more than 3 microns, or no more than 2 microns, or no more than 1 micron.

By having a different slope than its adjacent tip and base portions, the intermediate portion forms two distinct profile shapes: a first profile shape defined by the intermediate portion and its adjacent tip portion, and a second profile shape defined by the intermediate portion and its adjacent base portion. Moreover, by making the slope of the intermediate portion either smaller than that of both the tip portion and the base portion, or larger than that of both the tip portion and the base portion, the first and second profile shapes can be made to be opposite from the standpoint of being convex or concave. Thus, from the perspective of FIG. 8, a first profile shape defined by the intermediate portion 842b and the tip portion 842a is concave, while a second profile shape defined by the intermediate portion 842b and the base portion 842c is convex. (Similarly, a first profile shape defined by the intermediate portion 843b and the tip portion 843a is concave, while a second profile shape defined by the intermediate portion 843b and the base portion 843c is convex.) Here, we refer to a profile shape defined by two adjacent portions of the inclined surface of a prism as "concave" if the shape opens away from the prism, and as "convex" if the shape opens towards the prism. In the case of FIG. 8, where the intermediate portion has a smaller slope than the slopes of its adjacent tip and base portions, the first profile shape is concave and the second profile shape is convex. In other cases, where the intermediate portion has a greater slope than the slopes of its adjacent tip and base portions (see e.g. FIG. 11 below), the first profile shape is convex and the second profile shape is concave.

The film 840 also has a second structured surface 840b with a plurality of lenslets 844 formed therein. The surface 840b and lenslet 844 may be the same as the respective structured surface 640b and lenslet 644 discussed above. The outer edges of the lenslet 844 and the outer edges of the prism 841 are shown connected by dashed vertical line segments, which may be considered to mark the boundaries of the prism/ lenslet pair 848. A vertex of the lenslet is labeled V. The lenslet vertex V and the prism vertex Vprism may be used as reference points with which to characterize the degree of alignment (or misalignment) of the prism 841 relative to the lenslet 844. In many cases, it is desirable to tailor the curvature of the lenslet 844 and its orientation and separation relative to the prism 841 so that the prism vertex Vprism is disposed at or near the focal point of the lenslet.

Figure 9:
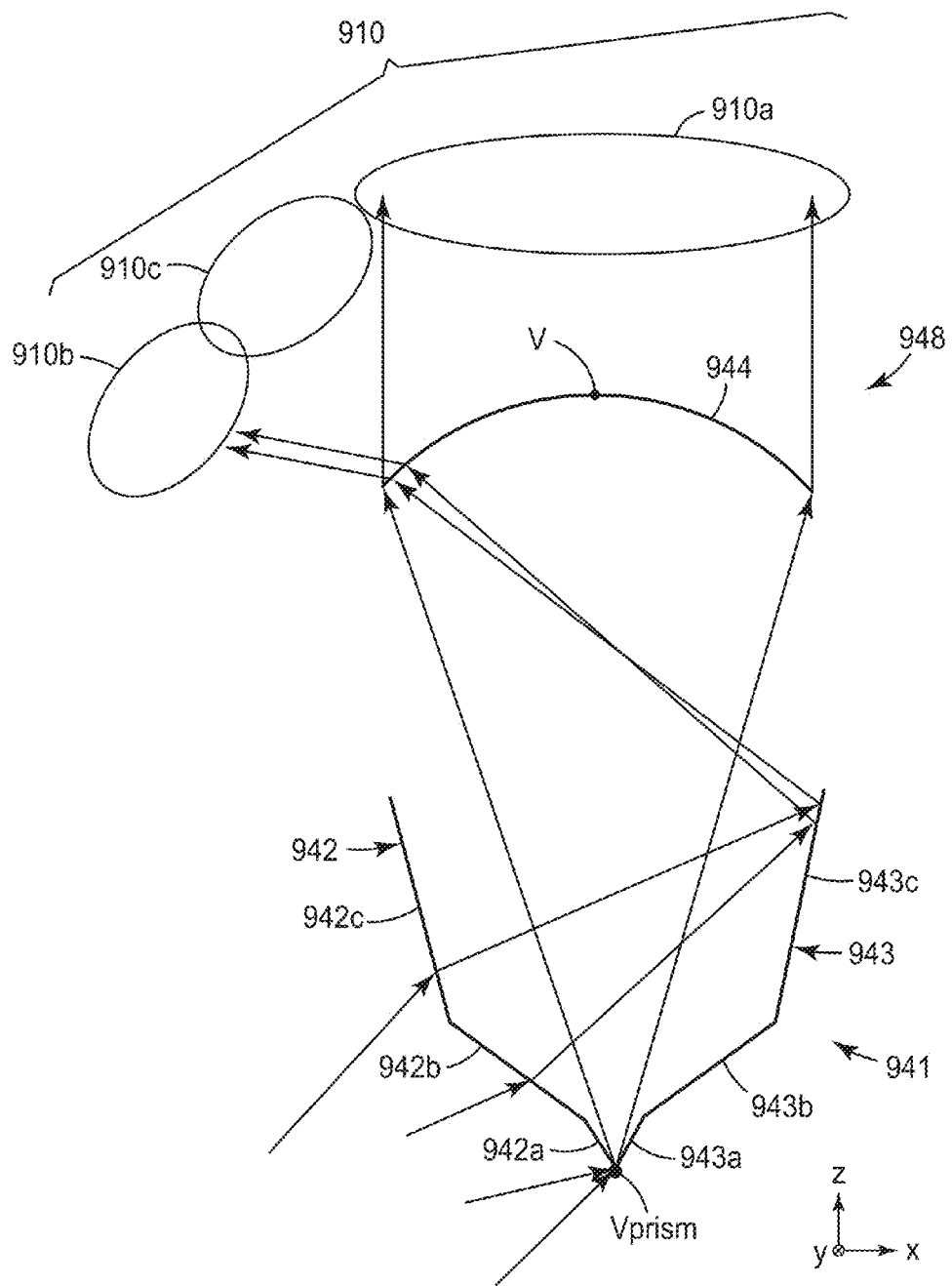
FIG. 9 is a schematic side or sectional view of a compound prism/lenslet pair similar to FIG. 8, but with light rays added to show how some oblique light rays entering a first inclined surface of the prism are redirected by the film to provide an output beam with two sharp edges.

FIG. 9 is a schematic view of a compound prism/lenslet pair 948 similar to FIG. 8, but with light rays added to show how some oblique light rays entering a first inclined surface of the prism are redirected by the film to provide an output beam with two sharp edges. The prism 941, which may be the same as or similar to prism 841 of FIG. 8, has a first inclined surface 942 and a second inclined surface 943, these inclined surfaces having tip portions 942a, 943a, base portions 942c, 943c, and intermediate portions 942b, 943b as shown. The tip portions 942a, 943a intersect at the vertex Vprism and define the vertex angle of the prism. The pair 948 also includes a lenslet 944, which may be the same as or similar to the lenslet 944 of FIG. 8. Light that is refracted and/or reflected by the inclined side surfaces of the prism 941 is focused or otherwise refracted by the lenslet 944 to produce an output beam, shown generally at 910.

By analyzing how oblique light rays are traced through the pair 948, we can gain an appreciation for which light rays contribute to which portions of the output beam 941. We can also gain an appreciation for what effect the design details of the pair 948, such as relative lengths and inclination angles of the different portions of the compound inclined surfaces, curvature of the lenslet, and position of the prism vertex Vprism relative to the focal point of the lenslet 944, have on the resulting output beam 910. Some such representative oblique light rays are shown in FIG. 9. Optimization of output beam characteristics such as the sharpness of both left and right beam edges can be achieved by controlling the range of capture angles from the peak of the prism to the lenslet, such control being achieved by judicious selection of the focal length of the lenslet, the amount of the lenslet that is exposed (pitch), and the facet angles of the different portions of the compound prism. For example, by placing the sharp prism vertex Vprism at or near the focal point of the lenslet 944, substantially all light that emanates from the prism vertex (see e.g. the two oblique light rays shown to impinge on the prism vertex Vprism) is sent parallel from the lenslet along the positive z-axis to provide a leading edge ray bundle 910*a*, and in turn create a first sharp angular cutoff or edge of the output beam. The amount of oblique light that is incident on the prism 941 at or near the prism vertex Vprism determines the brightness adjacent to this first edge of the beam, and is controlled by the included angle of the prism vertex and the distribution of oblique light from the light guide that impinges on the prism 941.

The compound design of the prism and its side surfaces can be used to direct more of the incident oblique light from one inclined surface upwards along the opposite inclined surface of the prism. In FIG. 9 the intermediate portion 942*b* of the inclined surface 942 has the effect of refracting light higher up along the base portion 943*c* of the inclined surface 943. This is done to direct some of the incident oblique light far from the focal point of the lenslet 944, because the light near the focal point of the lenslet exits the lenslet 944 nearer to the vertical direction, i.e., nearer to the z-axis, thus contributing to the leading edge ray bundle 910*a*. For light that travels to the lenslet farther from the prism vertex Vprism, such light exits the lenslet at increasing exitence angles relative to the normal to the plane of the film (i.e., relative to the z-axis in FIG. 9). With this control, a particular maximum exitence angle can be chosen for a known light guide output distribution. Light rays exiting the lenslet 944 at or near the maximum exitence angle provide a tail edge ray bundle 910*b*, and in turn create a second sharp angular cutoff or edge of the output beam 910 opposite the first sharp beam edge. Between the first and second sharp beam edges, other oblique light rays are refracted and reflected by the different portions of the compound inclined surfaces 942, 943 to provide a filler light ray bundle 910*c*. The ray bundles 910*a*, 910*b*, and 910*c* collectively form a single output beam 910 having two sharp beam edges.

Figure 10:
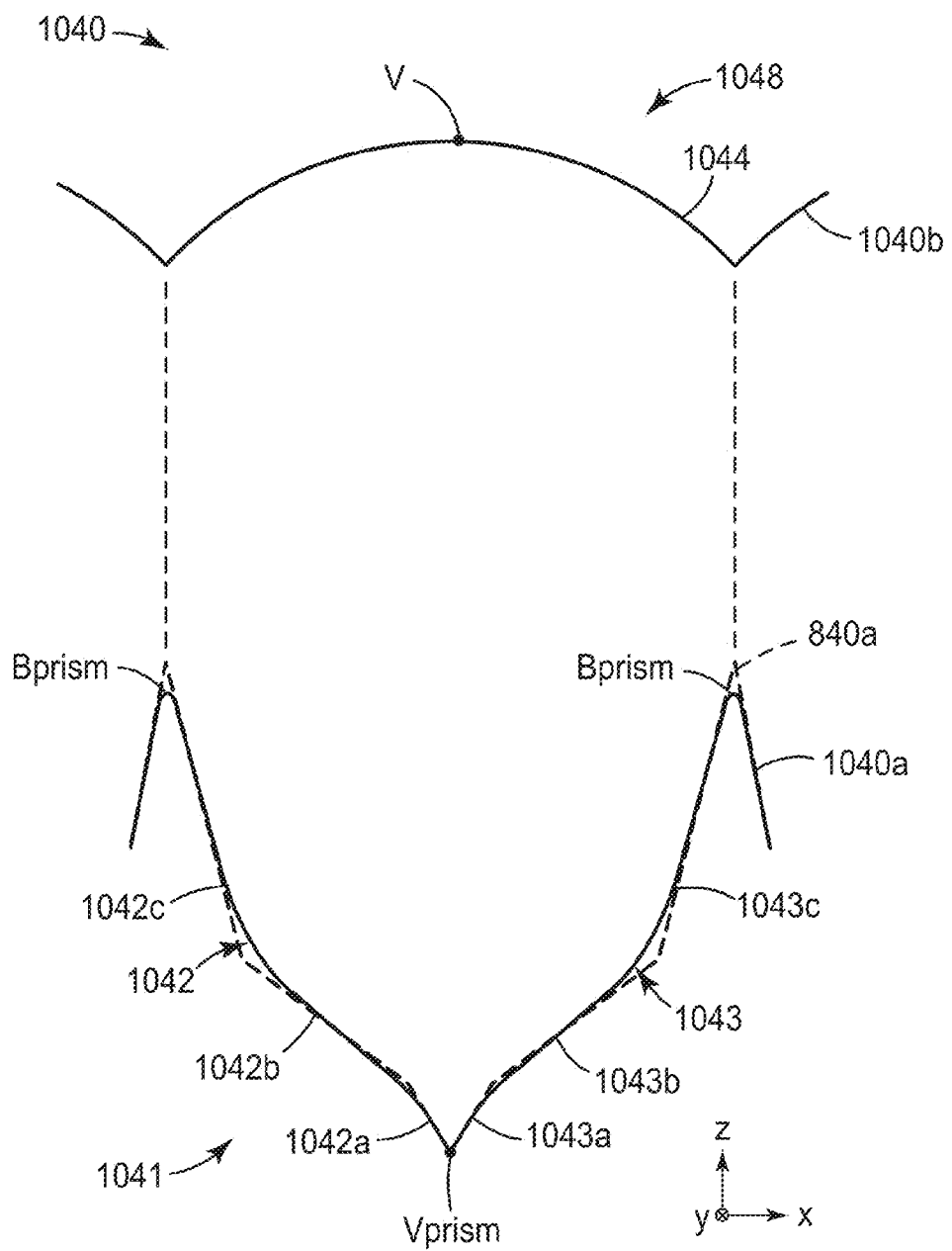
FIG. 10 is a schematic side or sectional view of another compound prism/lenslet pair suitable for use in the disclosed dual-sided optical films.

The principles of operation outlined above for the compound prism/lenslet pair 948 of FIG. 9 can also be employed in embodiments where the compound inclined surfaces of the compound prism are continuously curved, or even piecewise curved. Such an embodiment is shown in FIG. 10. In this figure, a dual-sided optical film 1040 has a first structured surface 1040*a* in which compound prisms 1041 are formed, and a second structured surface 1040*b* in which lenslets 1044 are formed. A one-to-one correspondence of lenslets to prisms results in prism/lenslet pairs, such as pair 1048. The lenslet 1044 may be the same as or similar to lenslet 944 of FIG. 9, or lenslet 844 of FIG. 8. The prism 1041 is similar in some respects but different in other respects to the prisms 941, 841. The prism 1041 is similar insofar as both of its inclined side surfaces 1042, 1043 are compound in design, these surfaces extending between base points Bprism and the prism vertex Vprism. Thus, inclined surface 1042 has a tip portion 1042*a*, an intermediate portion 1042*b*, and a base portion 1042*c*, and the intermediate portion 1042*b* has a smaller or larger (in this case, smaller) slope or inclination than the portions 1042*a*, 1042*c*. Likewise, inclined surface 1043 has a tip portion 1043*a*, an intermediate portion 1043*b*, and a base portion 1043*c*, and the intermediate portion 1043*b* also has a smaller or larger (here again, smaller in this embodiment) slope or inclination than the portions 1043*a*, 1043*c*. A first profile shape formed by the intermediate portion (1042*b* or 1043*b*) and its adjacent tip portion (1042*a* or 1043*a*, respectively) is concave, and a second profile shape formed by the intermediate portion (1042*b* or 1043*b*) and its adjacent base portion (1042*c* or 1043*c*, respectively) is convex. The prism 1041 is however different from prisms 941, 841 because the various tip, base, and intermediate portions of the prism 1041 are not individually flat. Instead, they are curved, and they form continuously curved inclined side surfaces 1042, 1043. Differences between the curved side surfaces 1042, 1043 and piecewise-flat side surfaces 842, 843 of FIG. 8 are emphasized in FIG. 10 by superimposing the piecewise-flat structured surface 840 (in dashed line) from FIG. 8 over the curved structured surface 1040*a*.

Figure 11:
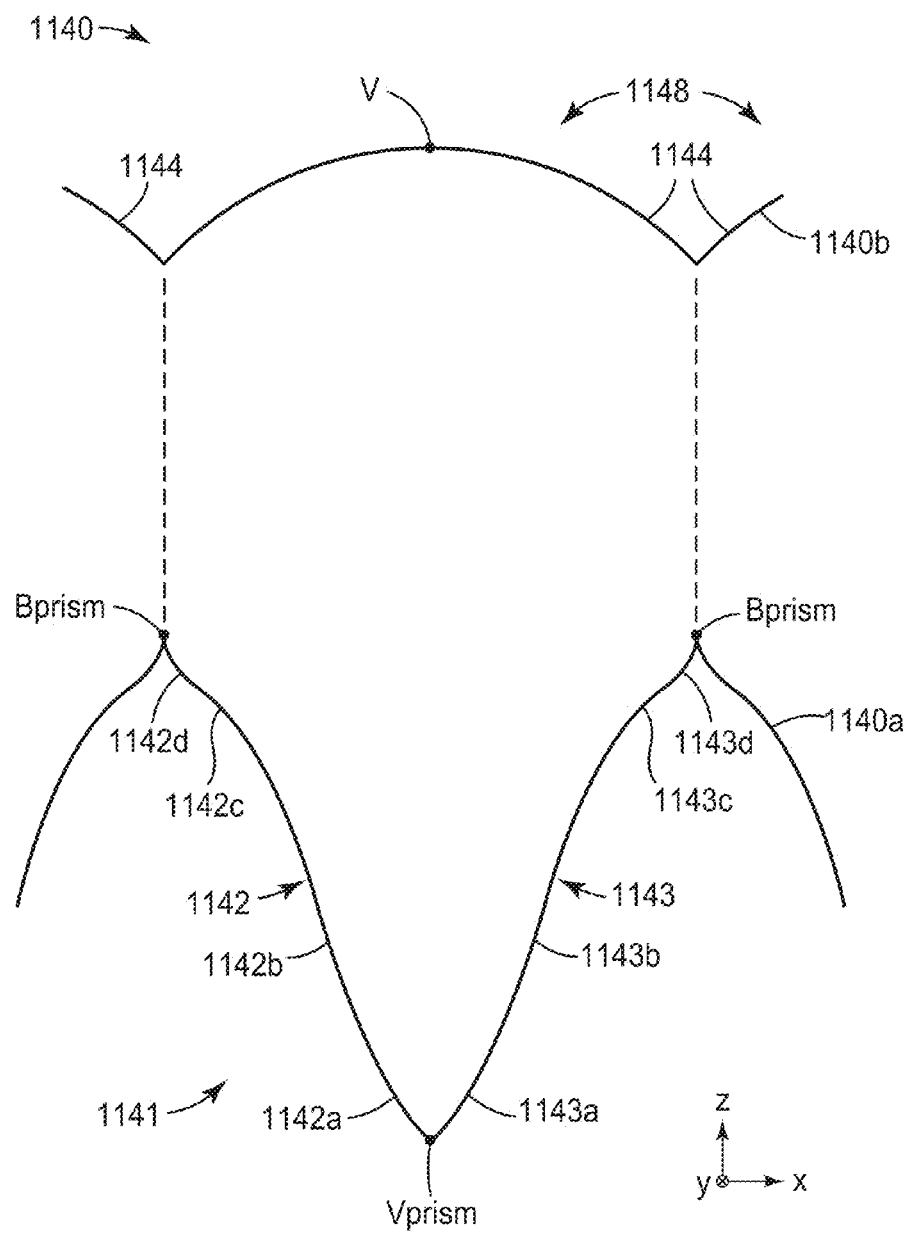
FIG. 11 is a schematic side or sectional view of a portion of another dual-sided optical film having compound prism/lenslet pairs.

Another dual-sided optical film having compound prisms with curved side surfaces is shown in FIG. 11. In this figure, a dual-sided optical film 1140 has a first structured surface 1140*a* in which compound prisms 1141 are formed, and a second structured surface 1140*b* in which lenslets 1144 are formed. A one-to-one correspondence of lenslets to prisms results in prism/lenslet pairs, such as pair 1148. The lenslet 1144 may be the same as or similar to lenslets 844, 944, and 1044 of FIGS. 8-10. The prism 1141 is similar to prism 1041, insofar its inclined side surfaces 1142, 1143 are compound in design, extending between base points Bprism and the prism vertex Vprism. The inclined surface 1142 has a tip portion 1142*a*, an intermediate portion 1142*b*, and a base portion 1142*c*, and the inclined surface 1143 has a tip portion 1143*a*, an intermediate portion 1143*b*, and a base portion 1143*c*. Note that in contrast to the embodiment of FIG. 10, the intermediate portion (1142*b*, 1143*b*) of FIG. 11 has a larger slope or inclination than that of its adjacent tip portion (1142*a*, 1143*a* respectively) and base portion (1142*c*, 1143*c* respectively). As a result, a first profile shape formed by the intermediate portion (1142*b* or 1143*b*) and its adjacent tip portion (1142*a* or 1143*a* respectively) is convex, and a second profile shape formed by the intermediate portion (1142*b* or 1143*b*) and its adjacent base portion (1142*c* or 1143*c* respectively) is concave. The inclined side surfaces 1142, 1143 are similar to those of prism 1041 insofar as they are continuously curved. In FIG. 11, the base portions 1142*c*, 1143*c* are separated from the base points Bprism by other portions 1142*d*, 1143*d* of the respective side surfaces. In this particular case, the other portions 1142*d*, 1143*d* have a greater slope or inclination than the adjacent (respective) base portions 1142*c*, 1143*c*. The embodiment of FIG. 11 therefore also demonstrates that the base portions discussed elsewhere herein need not be (but in some cases can be, and are) disposed at the base point of the prism; rather, the base portions need only be disposed closer to the base point than the tip portions and the intermediate portions.

The dual-sided optical film of FIG. 11 was modeled using optical design software. Details of the film construction, for purposes of the model, are as follows: the refractive index of the film was 1.67 for a central carrier film portion with an approximate thickness of 50 um, and 1.51 for the prism and split spreading structure portions; the prism apex angle was about 63.5 degrees; the lenslet had a variable radius of curvature (aspheric or a-cylinderic) but the nominal radius of curvature of the lenslet was approximately 41 microns; the prism pitch was 50 microns; the lenslet pitch was also 50 microns, and the lenslet vertex of each prism/lenslet pair was in vertical alignment with the vertex of its associated prism; the physical (vertical) distance from the lenslet vertex to the prism vertex was 111 microns; and no lenslet tilt and no prism tilt was assumed. Furthermore, the modeled prism 1141 was assumed to be symmetrical with respect to a vertical axis passing through the prism vertex, i.e., with respect to the optical axis of the prism. With regard to the exact shape that was used for the inclined side surfaces 1142, 1143, the shape is best described in FIGS. 12A, 12B, and 12C.

Figure 12A:
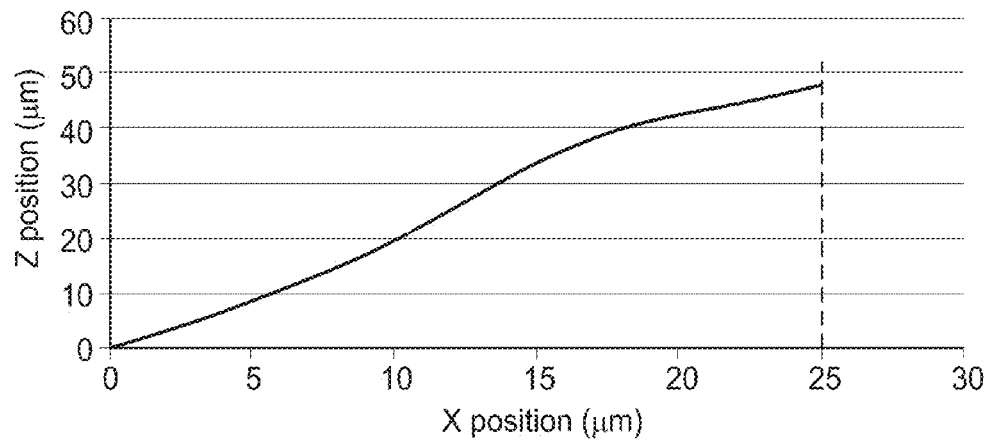
FIG. 12A is a graph that plots the shape or profile of one of the compound inclined surfaces of the compound prisms of FIG. 11.

FIG. 12A plots the actual profile of the side surface 1143. That is, FIG. 12A assumes the origin of the x-y-z coordinate system is placed at the prism vertex Vprism, and it plots the profile of the surface 1143 by plotting the z-coordinate or position for all points on the surface 1143 as a function of the x-coordinate or position. The resulting curve in FIG. 12A therefore reveals the actual profile of the modeled side surface 1143. In the figure, an x position of 0 microns corresponds to the vertex of the prism (Vprism), and an x position of 25 microns corresponds to the base point of the prism, Bprism. If one takes the first derivative of the curve shown in FIG. 12A with respect to the x-coordinate or position, the instantaneous slope at each point along the inclined surface 1143 can be determined. Such first derivative is plotted in FIG. 12B as a function of the same x-coordinate or position. Thus, in FIG. 12B, an x position of 0 microns again corresponds to the vertex of the prism (Vprism), and an x position of 25 microns again corresponds to the base point of the prism, Bprism. One may further take the second derivative of the curve shown in FIG. 12A (or the first derivative of the curve shown in FIG. 12B) with respect to the x-coordinate or position. Such a second derivative is plotted in FIG. 12C, again as a function of the same x-coordinate or position.

Figure 12B:
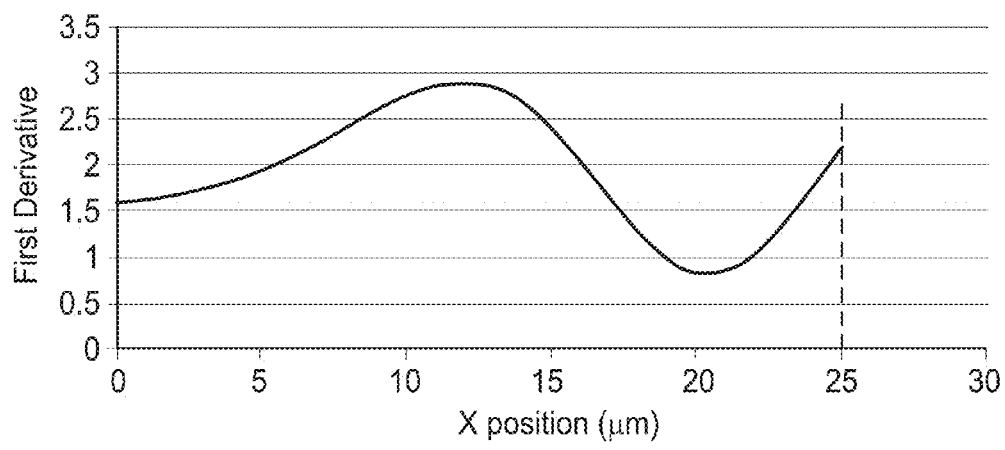
FIG. 12B is a graph of the first derivative of the function of FIG. 12A, i.e., a graph of the slope as a function of position for one of the compound inclined surfaces of the compound prisms of FIG. 11.
Figure 12C:
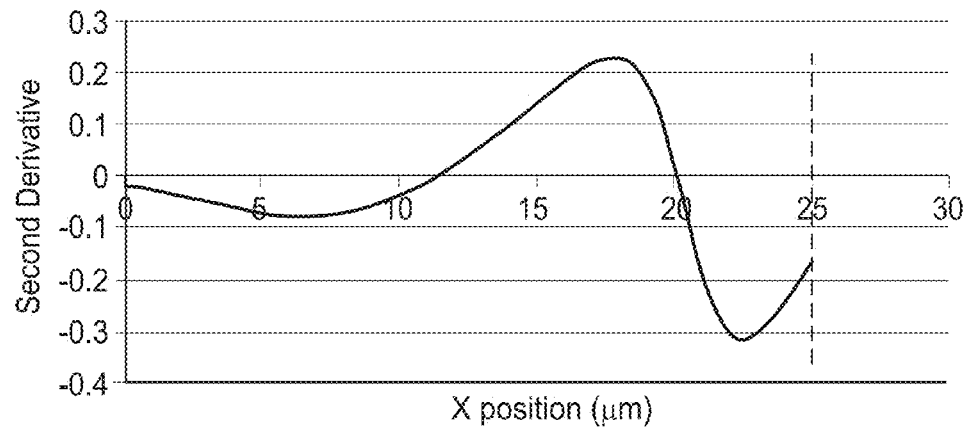
FIG. 12C is a graph of the second derivative of the function of FIG. 12A.

The curves of FIGS. 12A through 12C confirm the presence of a slope or inclination at an intermediate portion of the inclined surface (see e.g. the first derivative of FIG. 128 at an x position of about 12 microns) that is greater than both the slope at a tip portion (see e.g. the first derivative of FIG. 12B at an x position of about 5 microns) and the slope at a base portion (see e.g. the first derivative of FIG. 12B at an x position of about 20 microns). Inspection of FIG. 12C also reveals inflection points (where the curve equals zero) indicative of oppositely curved sections (concave and convex) of the inclined surface profile.

With the dual-sided optical film so defined, optical modeling software was used to determine what output beam it produced when the prism side of the film was exposed to oblique light, such as would be emitted from the major surface of a suitably designed light guide. In one case, oblique light in a first direction was modeled. In reference to FIG. 11, the oblique light of this first case had the following angular distribution: the distribution was Gaussian in the x-z plane, with a direction of maximum intensity at 70 degrees from the z-axis (and 20 degrees from the x-axis), with a full-width-at-half-maximum (FWHM) angular width of about 23 degrees in the x-z plane, and with a FWHM angular width of about 48 degrees in the y-z plane. This first case corresponds to a system in which light is injected into only one side of the light guide, e.g. as in FIG. 3. In a second case, the model assumed the oblique light in the first direction, but added to this light was another input beam of oblique light propagating in an opposite second direction. The second oblique input beam was symmetrical to the first relative to the y-z plane. This second case thus corresponds to a system in which light is injected into both sides of the light guide, e.g. a combination of FIGS. 3 and 4. Such light injection would thus also be expected to generate two light beams—one associated with a first light source, the other associated with a second light source.

Figure 13A:
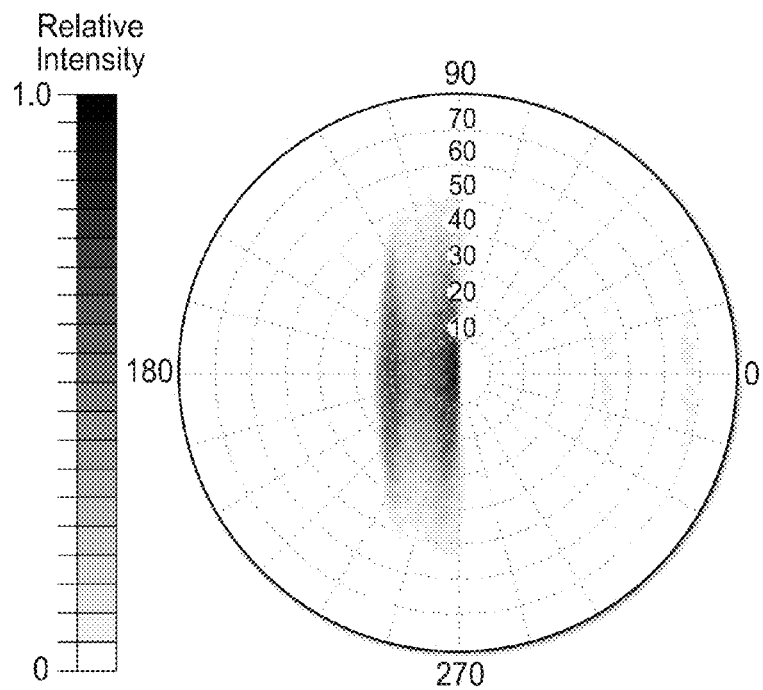
FIG. 13A is polar iso-candela plot (similar to a conoscopic plot) of modeled or calculated brightness of an output beam produced by a system in which the dual-sided film of FIG. 11 is illuminated with oblique light of a first direction (e.g. from a light guide such as that of FIG. 2, with one light source turned ON)
Figure 13B:
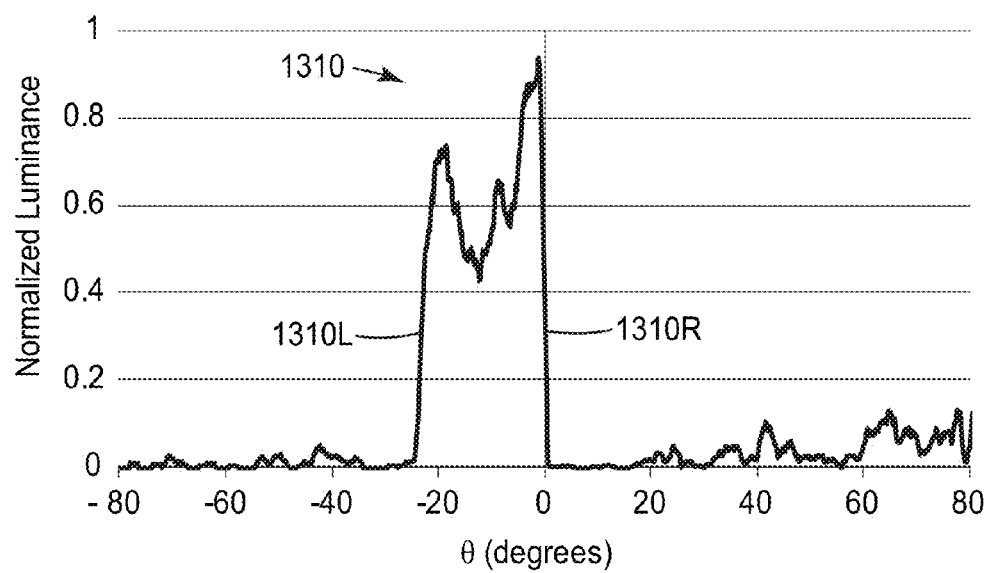
FIG. 13B is a graph of the brightness of FIG. 13A along a particular plane of observation.
Figure 14A:
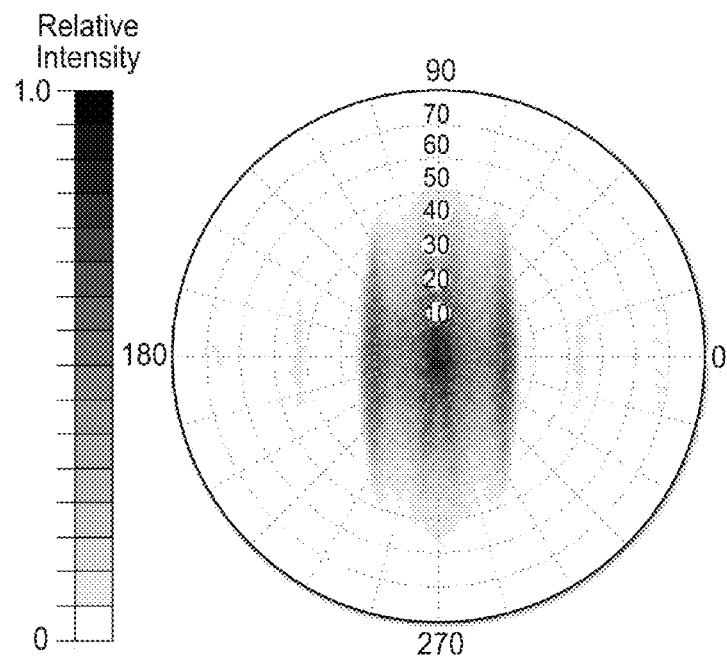
FIG. 14A is polar iso-candela plot of modeled or calculated brightness of an output beam produced by a system in which the dual-sided film of FIG. 11 is illuminated with oblique light of both a first and second direction (e.g. from a light guide such as that of FIG. 2, with light sources on opposite sides thereof turned ON)

Conoscopic plots are convenient for showing how light is emitted by the dual-sided film both as a function of polar angle and as a function of azimuthal angle. Closely related to conoscopic plots are polar iso-candela plots, which provide similar convenient angular information, except that the intensity values are not cosine corrected in a polar iso-candela plot; however, by dividing the intensity values by the cosine of the polar angle, relative luminance data can be obtained. FIG. 13A is a polar iso-candela plot of the modeled output light for the first case, and FIG. 14A is a polar iso-candela plot of the modeled output light for the second case. In these plots, azimuthal angles of 0 and 180 degrees correspond to the x-z plane in FIG. 11, and azimuthal angles of 90 and 270 correspond to the y-z plane. The angular distribution of the normalized luminance in the x-z plane, i.e., in the plane of observation perpendicular to the elongation axis of the prisms, is shown in FIG. 13B for the first case and in FIG. 14B for the second case. Both FIGS. 13B and 14B show intensity distributions with sharp beam edges on both a left and right side.

In FIG. 13B, a single first output beam 1310 is produced by light from one light source. The output beam 1310 has a left beam edge 1310L and a right beam edge 1310R, each of which are sharp. Using the methodology discussed above in connection with FIG. 7, we quantify the sharpness by the parameter $\Delta\theta_{LE}$ for the left beam edge, which equals about 3.4 degrees in this case, and by the parameter $\Delta\theta_{RE}$ for the right beam edge, which equals about 1.2 degrees.

Figure 14B:
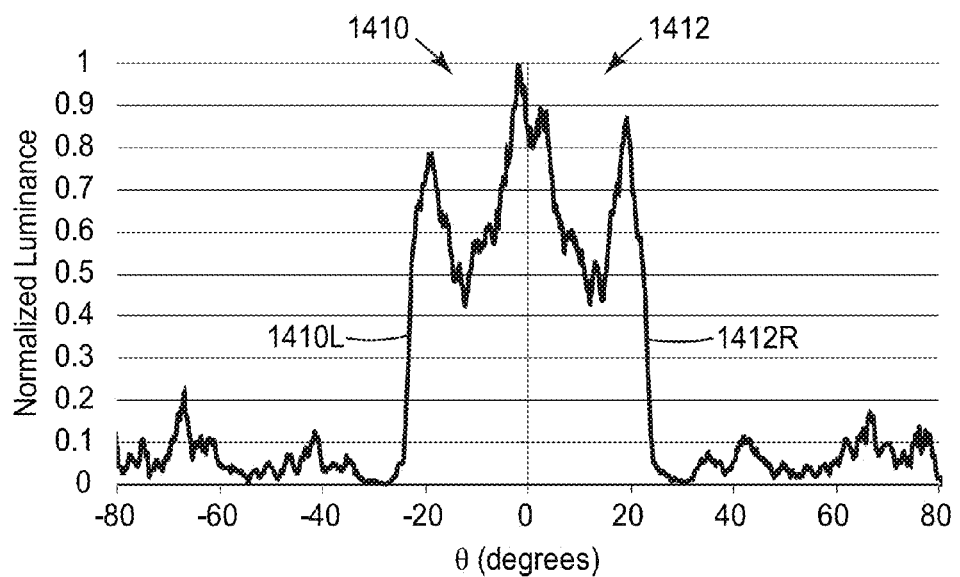
FIG. 14B is a graph of the brightness of FIG. 14A along a particular plane of observation.

Since the second case is essentially the first case with the addition of a second light beam produced by light from the second source of oblique light, we label the output light distribution in FIG. 14B as a first beam 1410 and a second beam 1412, even though it appears to be just a single beam. The first beam 1410 may be the same as or similar to the first beam 1310 of FIG. 13B. The nearest beam edges of the beams 1410, 1412 substantially coincide at a polar angle of about 0 degrees, such that a single wide beam is produced by the overlap of the first and second beams. The single wide beam has a left edge corresponding to the left edge 1410L of the first beam 1410, and a right edge corresponding to the right edge 1412R of the second beam 1412. Using the methodology of FIG. 7, we calculate the sharpness of edge 1410L to be $\Delta\theta_{LE}$=about 3.4 degrees, and the sharpness of edge 1412R to be $\Delta\theta_{RE}$=about 3.4 degrees.

Having now described several dual-sided optical films that incorporate lenslets and compound prisms, we now discuss in more detail various ways in which these elements can be combined in a film to produce a desired output beam in a lighting system. Design details of each prism/lenslet pair in the film, including the vertical separation of the prism and lenslet, the relative transverse position of these elements (whether they are in transverse alignment or not), the amount of tilt (if any) of the prism, and the amount of tilt (if any) of the lenslet, determine the shape and other properties of the output beam or beamlet produced by the given prism/lenslet pair, for a given input light beam. In some cases, a design parameter such as relative transverse position and/or amount of tilt changes over the face of the film, having one value in the center of the film and monotonically increasing or decreasing towards the outer edges or extremities of the film. Such spatial variation can be used to produce output beams such as output beam 410b of FIG. 4B. In other cases, the relevant design parameters may all be substantially the same over the face of the film, such that the beams or beamlets produced by all of the prism/lenslet pairs are substantially the same. Such spatial uniformity can be used to produce output beams such as output beam 410a in FIG. 4A.

Figure 15:
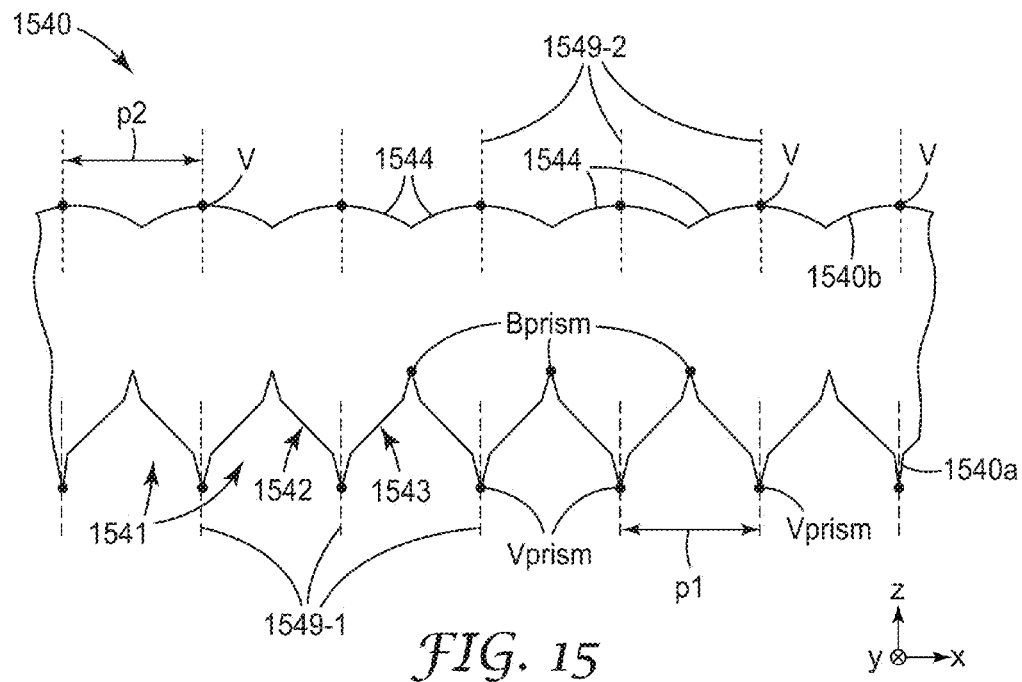
FIG. 15 is a schematic side view of an exemplary dual-sided optical film or portion thereof in which the lenslets are aligned with their respective prisms, and a pitch of the lenslets is the same as the pitch of the prisms.

A dual-sided optical film 1540 is shown schematically in FIG. 15. The film 1540 has a first structured surface 1540a and a second structured surface 1540b, the first structured surface 1540a having formed therein a plurality of elongated compound prisms 1541, and the second structured surface 1540b having formed therein a plurality of elongated lenslets 1544. The film 1540 is shown in relation to a Cartesian x-y-z coordinate system consistent with the previous figures other than FIG. 5.

Each compound prism 1541 includes two inclined side surfaces that intersect at a vertex Vprism, the inclined surfaces each having a compound configuration as discussed above. Each prism 1541 also has a prism optical axis 1549-1. The prism optical axis 1549-1 lies in the x-z plane, passes through the prism vertex, and bisects the prism vertex angle. The prisms 1541 are characterized by a prism pitch p1 from center-to-center (e.g. prism vertex to prism vertex) along the x-axis.

Each lenslet 1544 has a vertex V and a curvature which may be uniform or nonuniform from the vertex to the edges of the lenslet. Each lenslet also has an optical axis 1549-2. The lenslet optical axis 1549-2 passes through the vertex V and is perpendicular to the lenslet surface locally, at the point of the vertex V. If the lenslet is substantially symmetrical, then the lenslet optical axis 1549-2 is the axis of symmetry of the lenslet 1544. The lenslets 1544 are characterized by a lenslet pitch p2 from center-to-center (e.g. V to V) along the x-axis.

In the film 1540, the structured surfaces 1540a, 1540b are configured such that p1=p2, and each of the prism vertices Vprism is vertically aligned with the vertex V of its respective lenslet, and the prism optical axes 1549-1 are parallel to each other and to the z-axis, and the lenslet optical axes 1549-2 are also parallel to each other and to the z-axis. All of the prism optical axes 1549-1 and all of the lenslet optical axes 1549-2 in the film 1540 thus have zero tilt. In alternative embodiments, p1 may again equal p2, but the prism vertices Vprism may be misaligned from their respective lenslet vertices by a desired amount in order to steer the output beam in a particular direction. Thus, when illuminated by a oblique light from a light guide such as that of FIG. 2, output beams such as those of FIGS. 3 or 4a can be produced.

Figure 16:
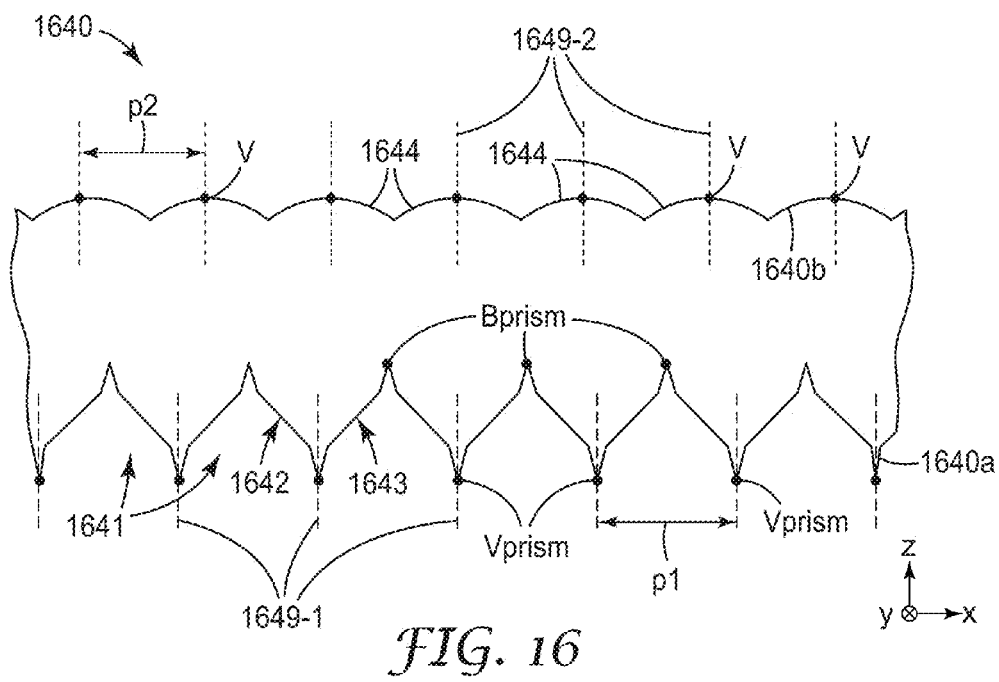
FIG. 16 is a schematic side view of an exemplary dual-sided optical film or portion thereof in which the pitch of the lenslets is different from the pitch of the prisms.

Another dual-sided optical film 1640 is shown in FIG. 16, in similar fashion to FIG. 15. The film 1640 has a first structured surface 1640a and a second structured surface 1640b, the first structured surface 1640a having formed therein a plurality of compound prisms 1641, and the second structured surface 1640b having formed therein a plurality of lenslets 1644. The film 1640 is shown in relation to a Cartesian x-y-z coordinate system consistent with the previous figures other than FIG. 5.

Each compound prism 1641 includes two inclined side surfaces that intersect at a vertex Vprism, the inclined surfaces each having a compound configuration. The compound prisms 1641 also each have a prism optical axis 1649-1 as discussed above. The prisms 1641 are characterized by a prism pitch p1.

Each lenslet 1644 has a vertex V, and a curvature which may be uniform or nonuniform. Each lenslet also has an optical axis 1549-2 as described above. The lenslets 1644 are characterized by a lenslet pitch p2 from center-to-center (e.g. V to V) along the x-axis.

In the film 1640, the structured surfaces 1640a, 1640b are configured such that p1>p2, and the prism optical axes 1649-1 are parallel to each other and to the z-axis, and the lenslet optical axes 1649-2 are also parallel to each other and to the z-axis. All of the prism optical axes 1649-1 and all of the lenslet optical axes 1649-2 in the film 1640 thus have zero tilt. For the prism/lenslet pair located in the center of the film (fourth vertex from the left extremity of the film and fourth vertex from the right extremity of the film), the prism vertex Vprism is vertically aligned with the vertex V of its respective lenslet. However, for the remaining prism/lenslet pairs on the film, no such vertical alignment occurs, and the amount of misalignment increases monotonically with increasing distance from the center of the film 1640. Films made using the technique shown in FIG. 16, or more generally where p1≠p2, can produce an effect where the central distribution of the output light can be pointed or aimed inward to produce a converging effect e.g. as shown in FIG. 4B. Greater degrees of misalignment produce greater levels of crosstalk, and the maximum acceptable degree of misalignment may be limited by the maximum acceptable crosstalk level for a particular application. Crosstalk is brought on when nominally aligned feature pairs (prism/lenslet pairs) begin to overlap with their nearest neighbors. In some cases, this approach of aiming light may be limited to an angle between the normal direction of the film (z-axis) and the central output angle of the various prism/lenslet pairs of about 10 degrees or less. Limits on this angle of deviation may depend on geometrical aspects of the film, such as thickness (see Dz in FIG. 17), pitch, substrate, included angle of the prism, etc., and is affected by the output distribution of the light guide.

In still other alternative designs, the lenslets in any of FIGS. 15 or 16 may be tilted in any desired fashion, for example, in a manner that changes as a function of position on the film, e.g., having zero tilt in the center of the film, increasingly positive tilts from the center to the left edge of the film, and increasingly negative tilts from the center to the right edge of the film. Similarly, the compound prisms in any of FIGS. 15 or 16 may be tilted in any desired fashion, for example, in a manner that changes as a function of position on the film, e.g., having zero tilt in the center of the film, increasingly positive tilts from the center to the left edge of the film, and increasingly negative tilts from the center to the right edge of the film.

Figure 17:
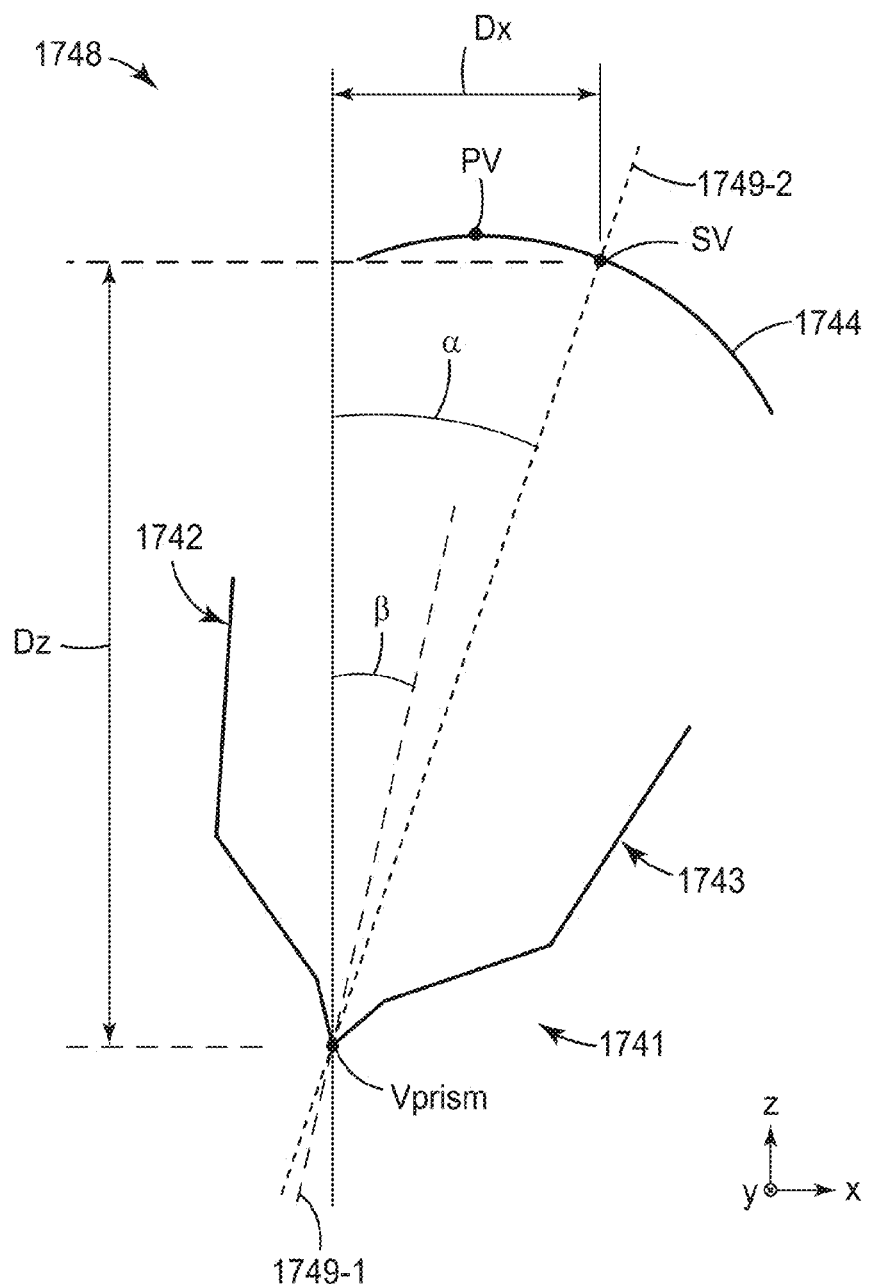
FIG. 17 is a schematic side view of a prism/lenslet pair, in which the elements are translationally and rotationally misaligned with each other, and are tilted by different amounts.

FIG. 17 shows an enlarged depiction of a generalized prism/lenslet pair that may be present in the disclosed dual-sided optical film. In this generalized pair, the elements are misaligned with each other both translationally and/or rotationally; they are also tilted by amounts that may be different. The prism/lenslet pair 1748 has one compound prism 1741 and one lenslet 1744. The compound prism 1741 has inclined side surfaces 1742, 1743 which meet at a vertex Vprism. Each inclined surface has a compound configuration as described above. The prism 1741 also has a prism optical axis 1749-1 which passes through the prism vertex as described above.

The lenslet 1744 is assumed to be tilted and, as such, the simple lenslet vertex V in the previous figures degenerates into two lenslet vertices in FIG. 17: a peak vertex PV and a symmetry vertex SV. The peak vertex PV is located at the highest point on the surface of the lenslet, i.e., the point at which the z-coordinate is maximum. The symmetry vertex SV is located at a point of symmetry of the lenslet, e.g., halfway between the endpoints of the lenslet, or, if the curvature of the lenslet varies across the lenslet such that there is a local maximum or local minimum in curvature in a central portion of the lenslet, then e.g. at the point of such local maximum or minimum. The optical axis 1749-2 of the lenslet passes through the symmetry vertex SV.

By appropriate selection of film thicknesses and/or coating thicknesses, the vertical distance Dz between the prism vertex Vprism and the lenslet symmetry vertex SV can be controlled to provide desired optical performance of the output beams, also taking into consideration the refractive index of the optical film. The lenslet 1744 is translationally misaligned with the compound prism 1741 by a displacement amount Dx along the x-axis. The lenslet 1744 is also rotationally misaligned with the compound prism 1741: the lenslet optical axis 1749-2 is tilted in the x-z plane with respect to the prism optical axis 1749-1, and furthermore, both the lenslet optical axis 1749-2 and the prism optical axis 1749-1 are tilted with respect to the z-axis. The angles α and β can be used to refer to the tilt angles of the lenslet optical axis and the prism optical axis, as shown in the figure. The dual-sided optical films disclosed herein can make appropriate use of the design parameters Dz, Dx, α, and β, which may be uniform over the area of the film (for all prism/lenslet pairs) or which may be non-uniform over such area. These parameters may be used to tailor first and second output beams as desired, the first output beam provided when only one of two light sources is ON, and the second output beam provided when only the other light source is ON.

Dual-sided optical films that employ tilting of the prisms and/or lenslets as shown in FIG. 17 can produce an effect where the central distribution of the output light can be pointed or aimed inward to produce a converging effect e.g. as shown in FIG. 4B. Greater degrees of misalignment produce greater levels of crosstalk, and the maximum acceptable degree of misalignment may be limited by the maximum acceptable crosstalk level for a particular application, as discussed above. In some cases, this approach of aiming light may be limited to an angle between the normal direction of the film (z-axis) and the central output angle of the various prism/split spreading structure pairs of about 35 degrees or less. Limits on this angle of deviation may depend on geometrical aspects of the film, such as thickness (see Dz in FIG. 17), pitch, substrate, included angle of the prism, etc., and is affected by the output distribution of the light guide. Reference is also made to patent application publication US 2012/0236403 (Sykora et al.) for further details of similar alignment techniques.

Figure 18A:
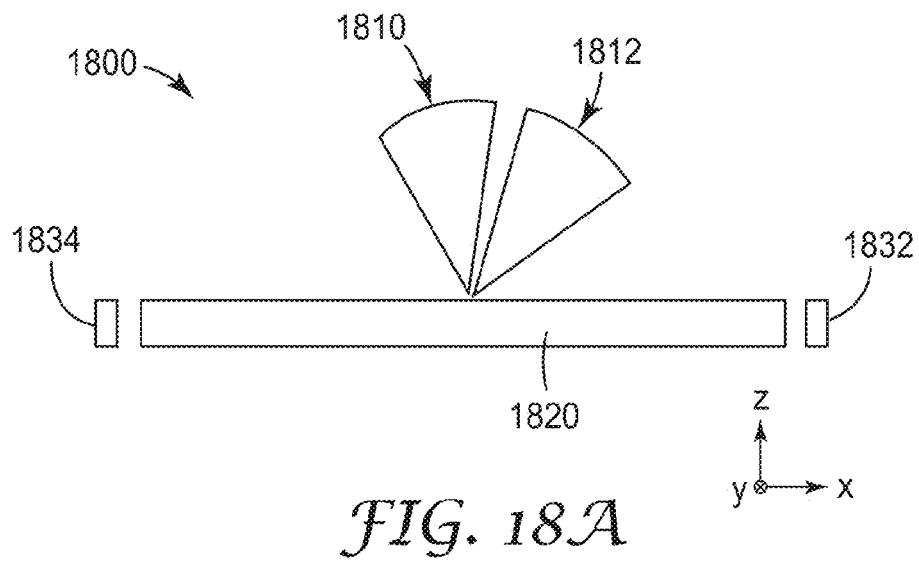
FIG. 18A is a schematic side or sectional view of an optical system in which two distinct output beams are provided, each with sharp beam edges, as a function of which of first and second light sources are energized, the optical system including a disclosed dual-sided optical film.

FIG. 18A shows a generalized optical system 1800 in which two distinct output beams 1810, 1812 are provided by selectively energizing first and second light sources 1834, 1832, respectively. Light from the light sources is converted to the respective output beams by an optical device 1820, which includes a dual-sided optical film with lenslets and compound prisms as described herein, and which may also include a light guide as described herein. Each output beam 1810, 1812 has two sharp beam edges in a plane of observation perpendicular to an elongation axis of the compound prisms. The beams 1810, 1812 are shown to have non-overlapping angular distributions, and have an appreciable angular gap between them, but in other embodiments the angular gap may be smaller or larger, or the beams may overlap with each other. The light sources may be controlled in any desired fashion such that only beam 1810 is produced, or only beam 1812 is produced, or both beams 1810, 1812 are produced.

Figure 18B:
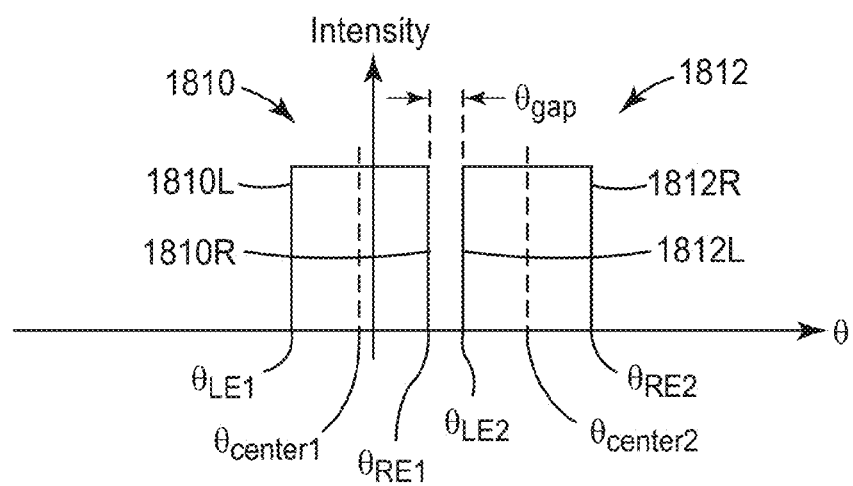
FIG. 18B is an angular distribution plot of the two output beams, shown in simplified form.

Simplified representations of the output beams 1810, 1812 are shown in the angular distribution graph of FIG. 18B, where light intensity in the x-z plane is plotted as a function of the polar angle θ. The first output beam 1810 is characterized by a left beam edge 1810L (which occurs at an angle $\theta_{LE1}$) and a right beam edge 1810R (which occurs at an angle $\theta_{RE1}$), as described above in connection with FIG. 7. The output beam 1810 also has center angle $\theta_{CENTER1}$, which is labeled, and a beam width $\Delta\theta_{B1}$, which is not labeled, all in conformity with the description of FIG. 7. Similarly, the second output beam 1812 is characterized by a left beam edge 1812L (which occurs at an angle $\theta_{LE2}$) and a right beam edge 1812R (which occurs at an angle $\theta_{RE2}$). The output beam 1812 also has center angle $\theta_{CENTER2}$, which is labeled, and a beam width $\Delta\theta_{B2}$, which is not labeled. Finally, the two output beams 1810, 1812 have nearest beam edges ($\theta_{RE1}$ and $\theta_{LE2}$) separated by a gap angle of $\theta_{gap}$.

The shape and other design details of the output distributions 1810 and 1812 are a function of the dual-sided film design and the light guide output distribution. For a given distribution of oblique light emitted by the light guide, the design details of the shape of the compound prism and features of the lenslet control the characteristics of the beams 1810, 1812, such as the overall distribution width $\theta_{RE2}-\theta_{LE1}$, the intensity, and the sharpness of the left edges 1810L, 1812L of the beams. The overall width $\theta_{RE2}-\theta_{LE1}$ can be changed by increasing or decreasing the apparent distance the tail edge bundle (see the tail edge ray bundle 910b in FIG. 9) is from the focal point of the lenslet. The closer the apparent tail edge bundle 910b is to the focal point of the lenslet, the narrower the beam widths ($\Delta\theta_{B1}$ and $\Delta\theta_{B2}$) of the beams 1810, 1812 become. Conversely, the farther away the apparent tail edge bundle 910b is from the focal point of the lenslet, the wider the beam widths ($\Delta\theta_{B1}$ and $\Delta\theta_{B2}$) of the beams 1810, 1812 become. The apparent distance from the tail edge bundle 910b to the focal point of the lenslet is controlled by the design of the compound prism for a given light guide input distribution. This can be modified by changing the slopes and lengths of the various portions of the inclined side surfaces, e.g., portions 942a, 942b, 942c, 943a, 943b, and 943c in FIG. 9. The center angles of the beams, θcenter1 and θcenter2 (which are measured relative to the normal axis of the film (i.e., relative to the z-axis)), are controlled by the degree of alignment or misalignment of the compound prism relative to the lenslet, as discussed in connection with FIGS. 15, 16, and 17. The sharpness of the inside edges of the beams, i.e., the beam edges 1810R and 1812L, is controlled by the degree of precision to which the vertex of the prism (Vprism) is placed relative to the focal point of the lenslet. By use of a variable-shaped lenslet (i.e., a lenslet whose curvature in the x-z plane is not uniform but is different at different points on the surface of the lenslet, e.g., monotonically increasing or monotonically decreasing from the center to the edges of the lenslet), the blur circle can be minimized. See e.g. patent application publication US 2011/0149391 (Brott et al.). By precisely controlling the thickness of the film, the sharpness of an inside edge such as beam edge 710R (FIG. 7) can be maximize, thus minimizing the differential angle $\Delta\theta_{RE}$ (FIG. 7). In reference again to FIG. 18B, the separation of beams 1810 and 1812, referred to as θgap, can be increased or decreased by controlling the amount of defocusing of the vertex of the compound prism with respect to the focal point of the lenset. By making the thickness of the dual-sided film thinner than the focal length of the lenslet, θgap can be made to increase, e.g. to a value of 5, 10, or 15 degrees. By making the thickness of the dual-sided film greater than the focal length of the lenslet, θgap can be made to decrease, e.g. to become substantially zero or negative, such that the beams 1810, 1812 overlap, e.g., $\theta_{RE1}$ may substantially equal $\theta_{LE2}$, or $\theta_{LE2}$ may fall between $\theta_{LE1}$ and $\theta_{RE1}$ (and $\theta_{RE1}$ may fall between $\theta_{LE2}$ and $\theta_{RE2}$), the amount of angular overlap being e.g. 5, or 10, or 15 degrees. Lenset shapes can also be provided with tailored non-uniform or variable curvatures to provide a variable focus so that the sharpness of the beam edges 1810L, 1810R, 1812L, and 1812R can be maximized.

Figure 19:
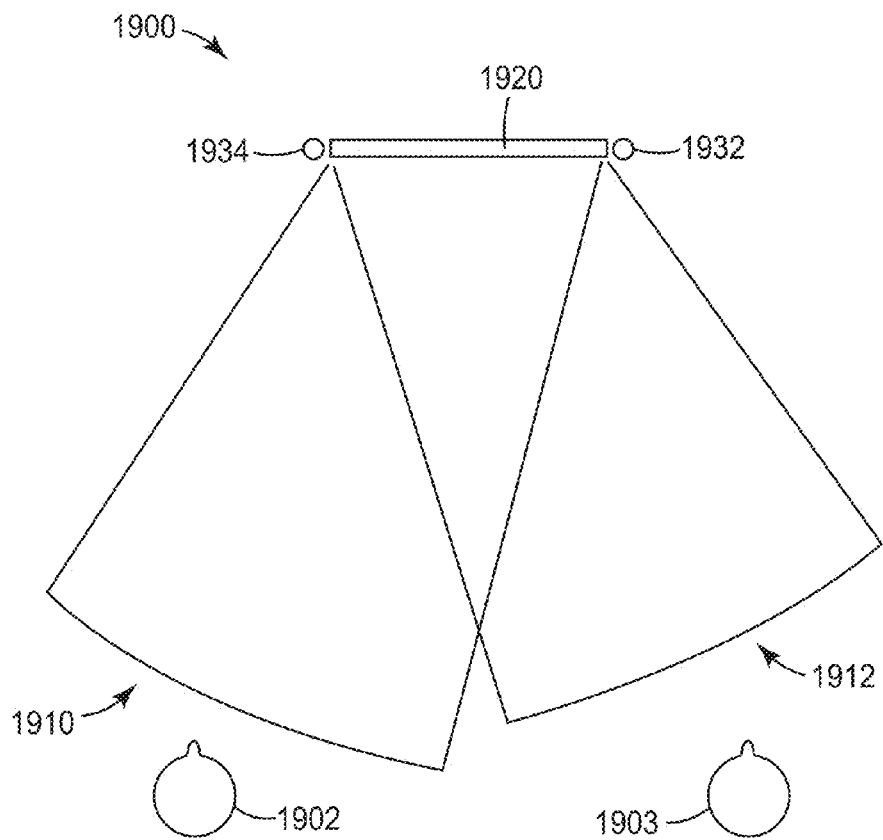
FIGS. 19, 20, and 21 are schematic views of other optical systems in which two distinct output beams are provided, each with sharp beam edges, as a function of which of first and second light sources are energized, each such optical system including a disclosed dual-sided optical film.
Figure 20:
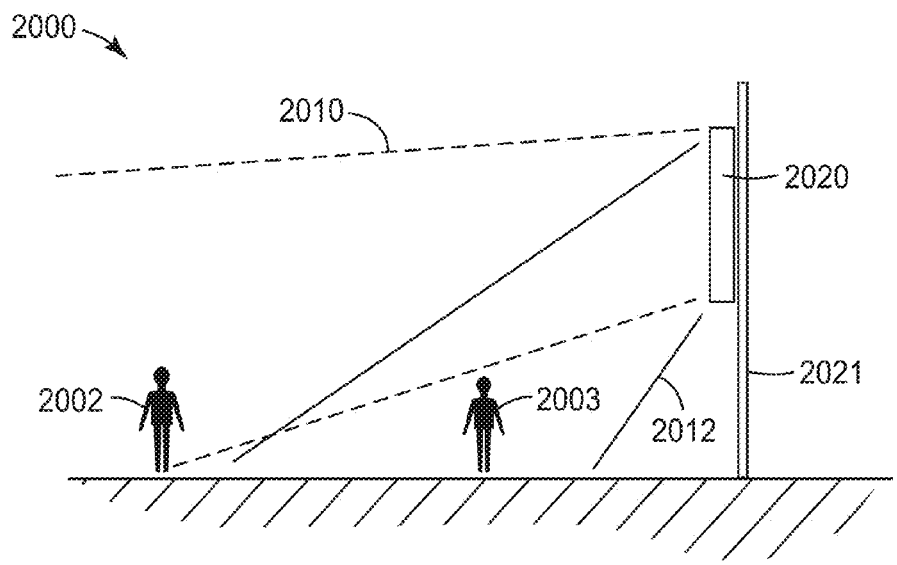
Figure 21:
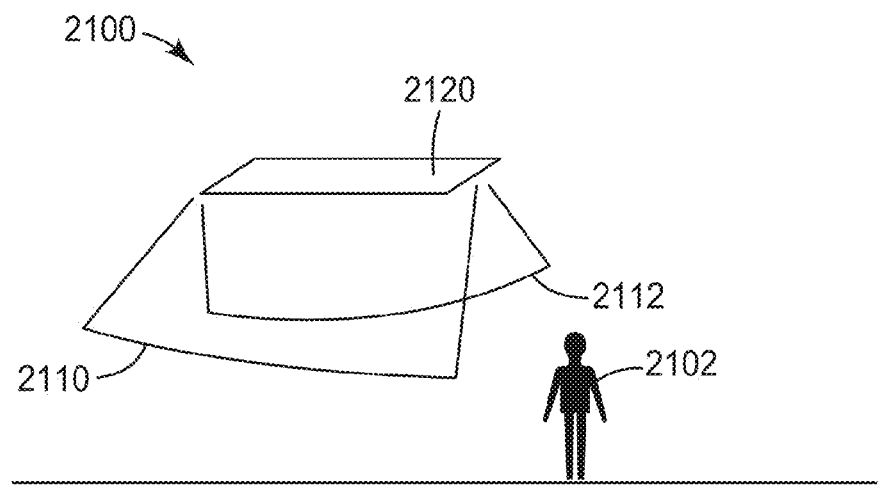

FIGS. 19, 20, and 21 are schematic views of other optical systems that incorporate the disclosed dual-sided optical films in order to provide two distinct output beams, each with sharp beam edges, as a function of which of first and second light sources are energized. In FIG. 19, an optical system 1900 includes an optical device 1920 coupled to first and second light sources 1934, 1932. The optical device 1920, which may be the same as or similar to optical device 1820, includes a dual-sided optical film with compound prisms as discussed above, and may include a light guide tailored to illuminate the prism side of the optical film with obliquely incident light as also discussed above. When the first light source 1934 is energized, the optical device produces a first output light beam 1910. When the second light source 1932 is energized, the optical device produces a second output light beam 1912. Both of these light beams have angular distributions with two opposed sharp beam edges. The optical system 1900 may or include any suitable system, including but not limited to a display, a backlight, a luminaire, a task light, or a general-purpose lighting module. In the case of a display, with appropriate control of image information provided to a display panel (not shown) in synchrony with modulation of the light sources 1934, 1932, different, unrelated images can be presented to viewers disposed at different positions relative to the device 1920. For example, a first viewer 1902 may perceive images associated with the first output beam 1910 but not the second output beam 1912, and a second viewer 1902 may perceive images associated with the second output beam 1912 but not the first output beam 1910.

In FIG. 20, an optical system 2000 includes an optical device 2020 coupled to first and second light sources (not shown). The optical device 2020 may be the same as or similar to optical devices 1820 and 1920, and includes a dual-sided optical film with compound prisms and a light guide, as discussed above. The device 2020 may be mounted on a pole or other support 2021. When the first light source is energized, the optical device 2020 produces a first output light beam 2010. When the second light source is energized, the optical device produces a second output light beam 2012. Both of these light beams have angular distributions with two opposed sharp beam edges. The optical system 2000 may or include any suitable system, including but not limited to a display, a backlight, a luminaire, a task light, or a general-purpose lighting module. The system 2000 may for example be used for traffic control purposes, e.g. to provide display information to a first viewer 2002 but not a second viewer 2003 or vice versa, or to project light of a given color (e.g. a red light for "stop" a green light for "go") to only the first viewer 2002, and light of the same or a different color to the second viewer 2003.

In FIG. 21, an optical system 2100 includes an optical device 2120 coupled to first and second light sources (not shown). The optical device 2120 may be the same as or similar to optical devices 1820, 1920, and 2020, and includes a dual-sided optical film with compound prisms and a light guide, as discussed above. The device 2120 may be mounted on or in a ceiling or other support (not shown). When the first light source is energized, the optical device 2120 produces a first output light beam 2110. When the second light source is energized, the optical device produces a second output light beam 2112. Both of these light beams have angular distributions with two opposed sharp beam edges. The optical system 2100 may or include suitable system, including but not limited to a display, a backlight, a luminaire, a task light, or a general-purpose lighting module. The system 2100 may for example be used as a luminaire to illuminate a room or space in which one or more occupants 2102 live or work. The capability to switch between the first and second light beams 2110, 2112 may be used for aesthetic or utilitarian purposes. An example of a utility of such a system is an embedded (and electronically switchable) spot light. Furthermore, by tailoring the output beams 2110 or 2112 to have a converging output distribution such as that of FIG. 4B, the system 2100 can act as a linear spot light to illuminate particular area(s) of interest. The system 2100 may also function as a luminaire that provides contrast-enhanced lighting.

Figure 22:
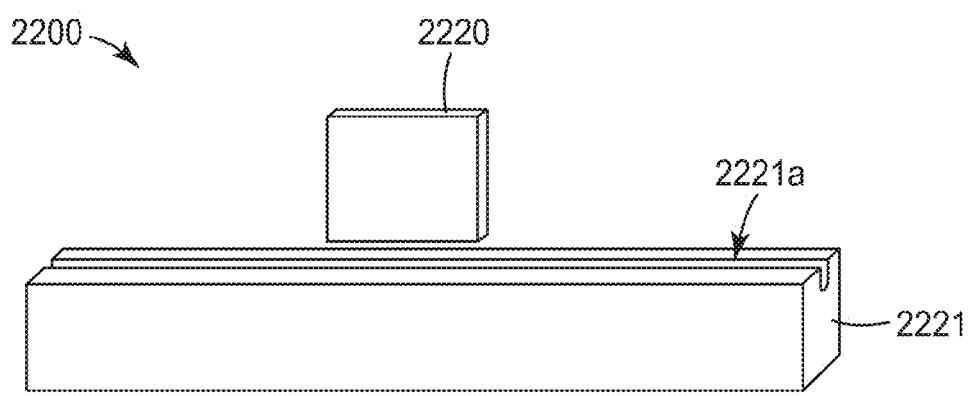
FIG. 22 is a schematic perspective view of an optical system in which a low-profile lighting component couples to an extended mounting member, the lighting component including a disclosed dual-sided optical film.
Figure 23A:
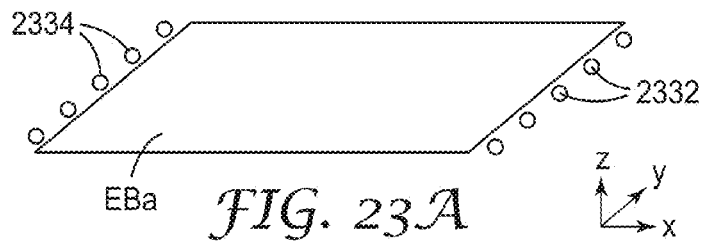
FIGS. 23A through 23E are schematic perspective views of optical systems which demonstrate some planar and non-planar shapes that the dual-sided optical film and/or the light guide may have.
Figure 23B:
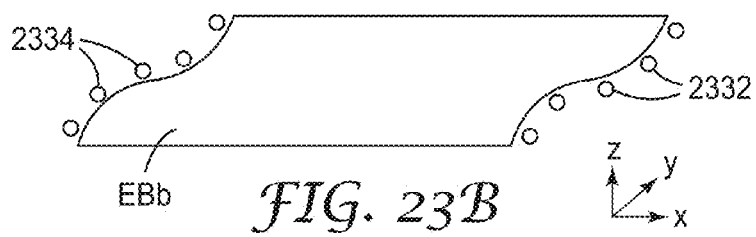
Figure 23C:
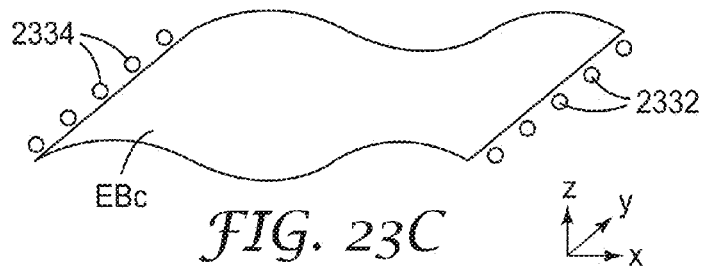
Figure 23D:
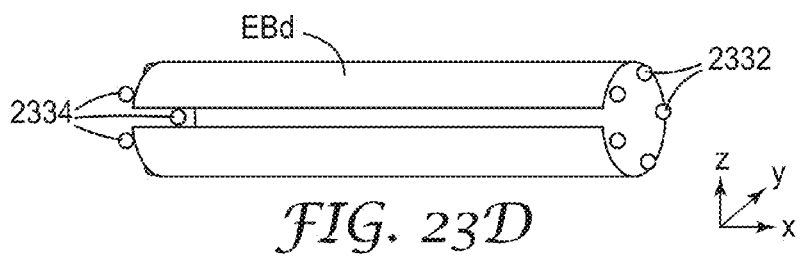
Figure 23E:
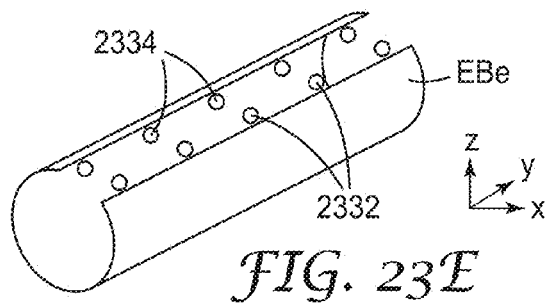

In an optical system 2200 of FIG. 22, a low-profile lighting component 2220 couples to an extended mounting member 2221. The component 2220, alternatively referred to herein as an optical device 2220, is coupled to first and second light sources (not shown), and may be the same as or similar to optical devices 1820, 1920, 2020, and 2120. The component 2220 thus includes a dual-sided optical film with compound prisms and a light guide, as discussed herein. The first and/or second light sources may be bonded to the component 2220 to provide a self-contained lighting module. The component 2220 is adapted to couple to the mounting member 2221 via a groove 2221a or by other suitable means. The mounting member 2221 may couple to the component 2220 mechanically and/or electrically, e.g., it may hold the component in position and/or supply the component with electrical power. The mounting member may itself be mounted to a ceiling, wall, or other surface, e.g. as a replacement for conventional track lights. The sharply-defined output beams provided by the component 2220 may be considered suitable substitutes for lighting provided by conventional spotlights, and in an attractive low-profile (thin) product configuration.

In any of the foregoing embodiments, including those of FIGS. 19 through 22, the dual-sided optical film can be tailored to provide a converging output beam such as that shown in FIG. 4B. For example, in the case of FIG. 21, a given output beam provided by the luminaire may converge to define a beam waist, and the beam waist can be designed to be located at any desired location, e.g., at a floor level or at a table level within the room.

The term "intensity" as used herein, including but not limited to FIGS. 6A and 7 and their related descriptions, may refer to any suitable measure of the brightness or strength of light, including both standard (cosine-corrected) luminance and non-cosine-corrected luminance, and radiance (cosine-corrected and non-cosine-corrected).

Numerous modifications can be made to, and numerous features incorporated into, the disclosed dual-sided optical films, light guides, and related components. For example, any given structured surface of the dual-sided optical film or of the light guide may be spatially uniform, i.e., the individual elements or structures of the structured surface may form a repeating pattern that occupies the entire major surface of the component. See e.g. FIGS. 1B and 2. Alternatively, any such structured surface may be patterned in such a way that portion(s) of the structured surface do not contain such individual elements or structures, or that the portion(s) contain such individual elements or structures, but such elements or structures have been rendered completely or partially inoperative. The absence of such individual elements or structures over portion(s) of the structured surface may be achieved by forming the elements or structures over the entire major surface, and then destroying or otherwise removing them by any suitable technique, e.g., applying sufficient heat and/or pressure to flatten the elements or structures, but selectively (pattern-wise) in the desired portion(s). Alternatively, the absence of the individual elements or structures may be achieved by not forming them in the desired portion(s) of the structured surface at the time when elements or structures are being formed in other regions of the structured surface, e.g. using at suitably patterned tool. In cases where individual elements or structures are rendered completely or partially inoperative in desired portion(s) of the structured surface, the structured surface may initially be spatially uniform, but individual elements or structures may then be coated or otherwise covered in a pattern-wise fashion with an adhesive, printing medium, or other suitable material whose refractive index matches (including substantially matches) the refractive index of the elements or structures, or that at least has a refractive index different from than air or vacuum. Such a pattern-wise applied material, which may be cured or crosslinked after application to the structured surface, may planarize the desired portion(s) of the structured surface. Whether the individual elements or structures are omitted or rendered inoperative, the optical system may be designed such that only one structured surface (e.g. a structured surface of the light guide, or a structured surface of the dual-sided film) is patterned, or only two structured surfaces are patterned, or only three structured surfaces are patterned, or four structured surfaces are patterned. If more than two structured surfaces are patterned, the same pattern may be used for any two patterned surfaces, or different patterns may be used.

In other alternatives, with a suitably designed light guide, two dual-sided optical films can be used on opposite sides of the light guide. The light guide may be configured to provide oblique light beams from each of its two opposed major surfaces, and one dual-sided film can be provided at each major surface of the light guide to convert the oblique light beam to a first sharp-edged output beam or a second sharp-edged output beam as discussed above, depending on which light source(s) are ON. For example, in FIG. 1B, a dual-sided film which is a mirror image (relative to the x-y plane) of the film 140 may be placed on the opposite side of the light guide 150 such that the light guide is disposed between the two mirror-image dual-sided optical films.

In other alternatives, the optical system may also include secondary structures to limit or reduce the degree of light spreading of the output beam(s) produced by the dual-sided optical film. For example, a conventional louvered privacy film and/or a shroud (e.g. including one or more light blocking members) may be provided at the output of the dual-sided film. These secondary structures may operate by occluding a portion of a given initial output beam in the x-z plane and/or in the y-z plane (refer e.g. to the x-y-z coordinate orientation of FIGS. 3, 4A, 4B) to produce a modified output beam, the modified output beam being narrower than the initial output beam in the plane(s) of occlusion.

The light guide and the dual-sided optical film may both be substantially planar in overall shape, or one or both may be non-planar. Exemplary lighting system embodiments are schematically depicted in FIGS. 23A through 23E. In each of these figures, first light sources 2334 and second light sources 2332 are provided along opposed edges of an extended body. The light sources 2334, 2332 may be the same as or similar to light sources 134, 132 discussed above. The extended body, which is labeled EBa in FIG. 23A, EBb in FIG. 23B, EBc in FIG. 23C, EBd in FIG. 23D, and EBe in FIG. 23E, may represent the light guide, the dual-sided optical film, or both. The extended bodies of these figures are shown in relation to Cartesian x-y-z coordinate systems consistent with the previous figures, other than FIG. 5. Deviations from planarity may be indicative of a flexible extended body, or a physically rigid extended body that was formed in a non-planar fashion. The extended body EBa is substantially planar, extending parallel to the x-y plane. The extended body EBb is non-planar, with curvature in the y-z plane but not in the x-z plane. The extended body EBc is also non-planar, but with curvature in the x-z plane and not in the y-z plane. Alternative embodiments may have curvature in both the x-z plane and the y-z plane. The extended body EBd is non-planar, with curvature in the y-z plane but not in the x-z plane, and the curvature in the y-z plane is such that the body closes in upon itself to form a tubular structure. The tubular structure may include a lengthwise slot or gap as shown. The tubular structure may have a substantially circular shape in transverse cross section (e.g., a cross section in the y-z plane), or alternatively an elliptical or other non-circular shape. The extended body EBd is non-planar, but with curvature in the x-z plane and not in the y-z plane, and the curvature in the x-z plane is such that the body closes in upon itself to form a tubular structure. The tubular structure may include a lengthwise slot or gap as shown. The tubular structure may have a substantially circular shape in transverse cross section (e.g., a cross section in the x-z plane), or alternatively an elliptical or other non-circular shape. Lighting systems having any of the shapes of FIGS. 23A through 23E may be constructed in any desired form factor, including a form factor similar to a conventional light bulb, and may be used in place of conventional light bulbs, with the added capability of switchable output beam distributions.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

This document discloses numerous embodiments, including but not limited to the following:

Item 1 is an optical film having opposed first and second structured surfaces, the optical film comprising:
  a plurality of extended prisms formed in the first structured surface;
  a plurality of extended lenslets formed in the second structured surface; and
  wherein the prisms and lenslets are arranged in a one-to-one correspondence of lenslets to prisms; and
  wherein at least some of the prisms are compound prisms, each compound prism having two inclined surfaces that are compound and a sharp vertex, each such compound inclined surface of each compound prism having a tip portion, a base portion, and an intermediate portion disposed between the tip portion and the base portion, the intermediate portion forming a first profile shape with the tip portion and a second profile shape with the base portion, and wherein the first profile shape is concave and the second profile shape is convex, or the first profile shape is convex and the second profile shape is concave.

Item 2 is the film of item 1, wherein, for each compound inclined surface of each compound prism, at least one of the tip portion, the base portion, and the intermediate portion is planar.

Item 3 is the film of item 1, wherein, for each compound inclined surface of each compound prism, at least one of the tip portion, the base portion, and the intermediate portion is curved.

Item 4 is the film of item 3, wherein, for each compound inclined surface of each compound prism, the compound inclined surface is continuously curved.

Item 5 is the film of item 1, wherein for each compound prism, the tip portions of its two inclined surfaces intersect to form the sharp vertex, and the vertex has a radius of curvature is no more than 3 microns, or no more than 2 microns, or no more than 1 micron.

Item 6 is the film of item 1, wherein the prisms extend along respective first elongation axes that are parallel to each other, and the lenslets extend along respective second elongation axes that are parallel to each other.

Item 7 is the film of item 6, wherein the first axes are parallel to the second axes.

Item 8 is the film of item 1, wherein the prisms have respective prism optical axes, and wherein at least some of the compound prisms are symmetrically shaped with respect to the prism optical axis.

Item 9 is the film of item 1, wherein the prisms have respective prism optical axes, and wherein at least some of the compound prisms are not symmetrically shaped with respect to their respective prism optical axes.

Item 10 is the film of item 1, wherein for each prism-lenslet pair, the lenslet has a focal point, and the prism has a vertex that is disposed at or near the focal point.

Item 11 is the film of item 1, wherein the intermediate portion has a smaller angle of inclination than that of the tip portion and the base portion, and the first profile shape is concave, and the second profile shape is convex.

Item 12 is the film of item 1, wherein the intermediate portion has a larger angle of inclination than that of the tip portion and the base portion, and the first profile shape is convex, and the second profile shape is concave.

Item 13 is an optical system, comprising:
the optical film of item 1; and
a light guide having a major surface adapted to emit light preferentially at oblique angles;
wherein the optical film is disposed proximate the light guide and oriented so that light emitted from the major surface of the light guide enters the optical film through the first structured surface.

Item 14 is the system of item 13, wherein the optical film and the light guide are non-planar.

Item 15 is the system of item 13, wherein the optical film and the light guide are flexible.

Item 16 is the system of item 13, further comprising one or more light sources attached to the light guide.

Item 17 is the system of item 13, wherein the system comprises a display, a backlight, a luminaire, a task light, or a general-purpose lighting module.

Item 18 is an optical system, comprising:
a light guide having a major surface adapted to emit light;
a first light source configured to inject light into the light guide along a first direction; and
an optical film having opposed first and second structured surfaces, the first structured surface having a plurality of extended prisms formed therein, and the second structured surface having a plurality of extended lenslets formed therein, the prisms and lenslets being arranged in a one-to-one correspondence of lenslets to prisms; and
wherein the optical film is disposed proximate the light guide and oriented so that light emitted from the major surface of the light guide enters the optical film through the first structured surface and exits the second structured surface of the optical film, the light exiting the optical film forming a first output beam when the first light source is energized; and
wherein the first output beam has a first intensity distribution as a function of angle θ, the first intensity distribution being characterized by a first left beam edge at an angle $\theta_{LE1}$, a first right beam edge at an angle $\theta_{RE1}$, a first baseline intensity Ibaseline1, and a first maximum intensity Imax1 and a first minimum intensity Imin1 between the first left and first right beam edges;
wherein the first left beam edge has a sharpness characterized by a transition angle $\Delta\theta_{LE1}$, and the first right beam edge has a sharpness characterized by a transition angle $\Delta\theta_{RE1}$, where $\Delta\theta_{LE1}$ and $\Delta\theta_{RE1}$ are measured from 10% to 90% intensity levels between Imax1 and Ibaseline1; and
wherein $\Delta\theta_{LE1}$ is no more than 7 degrees, $\Delta\theta_{RE1}$ is no more than 7 degrees, Imin1 is at least Ibaseline1+20%*(Imax1−Ibaseline1), and a first beam width equal to $\theta_{RE1}-\theta_{LE1}$ is at least 10 degrees.

Item 19 is the system of item 18, wherein at least some of the prisms in the optical film are compound prisms whose two inclined surfaces are compound, each such compound inclined surface of each such compound prism having a tip portion, a base portion, and an intermediate portion disposed between the tip portion and the base portion, the intermediate portion forming a first profile shape with the tip portion and a second profile shape with the base portion, and wherein the first profile shape is concave and the second profile shape is convex, or the first profile shape is convex and the second profile shape is concave.

Item 20 is the system of item 18, further comprising:
a second light source configured to inject light into the light guide along a second direction different front the first direction;
wherein the light exiting the optical film forms a second output beam when the second light source is energized; and
wherein the second output beam has a second intensity distribution as a function of angle θ, the second intensity distribution being characterized by a second left beam edge at an angle $\theta_{LE2}$, a second right beam edge at an angle $\theta_{RE2}$, a second baseline intensity Ibaseline2, and a second maximum intensity Imax2 and a second minimum intensity Imin2 between the second left and second right beam edges;
wherein the second left beam edge has a sharpness characterized by a transition angle $\Delta\theta_{LE2}$, and the second right beam edge has a sharpness characterized by a transition angle $\Delta\theta_{RE2}$, where $\Delta\theta_{LE2}$ and $\Delta\theta_{RE2}$ are measured from 10% to 90% intensity levels between Imax2 and Ibaseline2; and
wherein $\Delta\theta_{LE2}$ is no more than 7 degrees, $\Delta\theta_{RE2}$ is no more than 7 degrees, Imin2 is at least Ibaseline2+20%*(Imax2−Ibaseline2), and a second beam width equal to $\theta_{RE2}-\theta_{LE2}$ is at least 10 degrees.

Item 21 is the system of item 20, wherein $\Delta\theta_{LE1}$, $\Delta\theta_{RE1}$, $\Delta\theta_{LE2}$, and $\Delta\theta_{RE2}$ are each no more than 5 degrees, or no more than 3 degrees, or no more than 2 degrees.

Item 22 is the system of item 20, wherein Imin1 is at least Ibaseline1+30%*(Imax1−Ibaseline1), or at least Ibaseline1+40%*(Imax1−Ibaseline1), and Imin2 is at least Ibaseline2+30%*(Imax2−Ibaseline2), or at least Ibaseline2+40%*(Imax2−Ibaseline2).

Item 23 is the system of item 20, wherein the first beam width and the second beam width are each at least 20 degrees, or at least 30 degrees, or in a range from 10 to 40 degrees.

Item 24 is the system of item 20, wherein $\theta_{LE2}$ is in a range from $\theta_{LE1}$ and $\theta_{RE1}$, whereby the first and second output beams overlap.

Item 25 is the system of item 20, wherein the first and second output beams are spaced apart from each other and have nearest beam edges separated by at least 3 degrees.

Item 26 is the system of item 18, wherein the optical film and the light guide are non-planar.

Item 27 is the system of item 18, wherein the optical film and the light guide are flexible.

Item 28 is the system of item 18, wherein the first light source is attached to the light guide.

Item 29 is the system of item 18, wherein the optical film is attached to the light guide.

Item 30 is the system of item 18, wherein the system comprises a display, a backlight, a luminaire, a task light, or a general-purpose lighting module.

The invention claimed is:

1. An optical system, comprising:
   a light guide having a major surface adapted to emit light;
   a first light source configured to inject light into the light guide along a first direction; and
   an optical film having opposed first and second structured surfaces, the first structured surface having a plurality of extended prisms formed therein, and the second structured surface having a plurality of extended lenslets formed therein, the prisms and lenslets being arranged in a one-to-one correspondence of lenslets to prisms; and
   wherein the optical film is disposed proximate the light guide and oriented so that light emitted from the major surface of the light guide enters the optical film through the first structured surface and exits the second structured surface of the optical film, the light exiting the optical film forming a first output beam when the first light source is energized; and
   wherein the first output beam has a first intensity distribution as a function of angle θ, the first intensity distribution being characterized by a first left beam edge at an angle $\theta_{LE1}$, a first right beam edge at an angle $\theta_{RE1}$, a first baseline intensity Ibaseline1, and a first maximum intensity Imax1 and a first minimum intensity Imin1 between the first left and first right beam edges;
   wherein the first left beam edge has a sharpness characterized by a transition angle $\Delta\theta_{LE1}$, and the first right beam edge has a sharpness characterized by a transition angle $\Delta\theta_{RE1}$, where $\Delta\theta_{LE1}$ and $\Delta\theta_{RE1}$ are measured from 10% to 90% intensity levels between Imax1 and Ibaseline1; and
   wherein $\Delta\theta_{LE1}$ is no more than 7 degrees, $\Delta\theta_{RE1}$ is no more than 7 degrees, Imin1 is at least Ibaseline1+20%*(Imax1−Ibaseline1), and a first beam width equal to $\theta_{RE1}-\theta_{LE1}$ is at least 10 degrees.

2. The system of claim 1, wherein at least some of the prisms in the optical film are compound prisms whose two inclined surfaces are compound, each such compound inclined surface of each such compound prism having a tip portion, a base portion, and an intermediate portion disposed between the tip portion and the base portion, the intermediate portion forming a first profile shape with the tip portion and a second profile shape with the base portion, and wherein the first profile shape is concave and the second profile shape is convex, or the first profile shape is convex and the second profile shape is concave.

3. The system of claim 1, further comprising:
   a second light source configured to inject light into the light guide along a second direction different from the first direction;
   wherein the light exiting the optical film forms a second output beam when the second light source is energized; and
   wherein the second output beam has a second intensity distribution as a function of angle θ, the second intensity distribution being characterized by a second left beam edge at an angle $\theta_{LE2}$, a second right beam edge at an angle $\theta_{RE2}$, a second baseline intensity Ibaseline2, and a second maximum intensity Imax2 and a second minimum intensity Imin2 between the second left and second right beam edges;
   wherein the second left beam edge has a sharpness characterized by a transition angle $\Delta\theta_{LE2}$, and the second right beam edge has a sharpness characterized by a transition angle $\Delta\theta_{RE2}$, where $\Delta\theta_{LE2}$ and $\Delta\theta_{RE2}$ are measured from 10% to 90% intensity levels between Imax2 and Ibaseline2; and
   wherein $\Delta\theta_{LE2}$ is no more than 7 degrees, $\Delta\theta_{RE2}$ is no more than 7 degrees, Imin2 is at least Ibaseline2+20%*(Imax2−Ibaseline2), and a second beam width equal to $\theta_{RE2}-\theta_{LE2}$ is at least 10 degrees.

4. The system of claim 3, wherein $\Delta\theta_{LE1}$, $\Delta\theta_{RE1}$, $\Delta\theta_{LE2}$, and $\Delta\theta_{RE2}$ are each no more than 5 degrees, or no more than 3 degrees, or no more than 2 degrees.

5. The system of claim 3, wherein Imin1 is at least Ibaseline1+30%*(Imax1−Ibaseline1), or at least Ibaseline1+40%*(Imax1−Ibaseline1), and Imin2 is at least Ibaseline2+30%*(Imax2−Ibaseline2), or at least Ibaseline2+40%*(Imax2−Ibaseline2).

6. The system of claim 3, wherein the first beam width and the second beam width are each least 20 degrees, or at least 30 degrees, or in a range from 10 to 40 degrees.

7. The system of claim 3, wherein $\theta_{LE2}$ is in a range from $\theta_{LE1}$ and $\theta_{RE1}$, whereby the first and second output beams overlap.

8. The system of claim 3, wherein the first and second output beams are spaced apart from each other and have nearest beam edges separated by at least 3 degrees.

9. The system of claim 1, wherein the optical film and the light guide are non-planar.

10. The system of claim 1, wherein the optical film and the light guide are flexible.

11. The system of claim 1, wherein the first light source is attached to the light guide.

12. The system of claim 1, wherein the optical film is attached to the light guide.

13. The system of claim 1, wherein the system comprises a display, a backlight, a luminaire, a task light, or a general-purpose lighting module.

* * * * *